US009656247B2

(12) United States Patent
Daly et al.

(10) Patent No.: US 9,656,247 B2
(45) Date of Patent: May 23, 2017

(54) TREATING OF CATALYST CARRIER, FISCHER-TROPSCH CATALYSTS AND METHOD OF PREPARATION THEREOF

(71) Applicant: Velocys Technologies Limited, Abingdon, Oxfordshire (GB)

(72) Inventors: Francis Daly, Waldoboro, ME (US); Laura Richard, Abingdon (GB); Sreekala Rugmini, Didcot (GB)

(73) Assignee: Velocys Technologies Limited, Abingdon, Oxfordshire (GB)

( * ) Notice: Subject to any disclaimer, the term of this patent is extended or adjusted under 35 U.S.C. 154(b) by 0 days.

(21) Appl. No.: 14/373,920

(22) PCT Filed: Jan. 29, 2013

(86) PCT No.: PCT/GB2013/050193
§ 371 (c)(1),
(2) Date: Jul. 23, 2014

(87) PCT Pub. No.: WO2013/114098
PCT Pub. Date: Aug. 8, 2013

(65) Prior Publication Data
US 2015/0018439 A1    Jan. 15, 2015

(30) Foreign Application Priority Data

Jan. 30, 2012   (GB) .................................. 1201619.2

(51) Int. Cl.
*B01J 21/06* (2006.01)
*B01J 23/75* (2006.01)
(Continued)

(52) U.S. Cl.
CPC ............. *B01J 23/75* (2013.01); *B01J 21/063* (2013.01); *B01J 21/08* (2013.01); *B01J 23/8896* (2013.01);
(Continued)

(58) Field of Classification Search
CPC ................................ B01J 21/063; B01J 23/75
See application file for complete search history.

(56) References Cited

U.S. PATENT DOCUMENTS 5,397,806 A    3/1995  Soled et al.
5,945,459 A *  8/1999  Mauldin .............. B01J 23/8896
                                                      518/700
(Continued)

FOREIGN PATENT DOCUMENTS

JP        2009219980    10/2009
WO           0183108    11/2001
(Continued)

OTHER PUBLICATIONS

Hinchiranan et al.; "TiO2 promoted Co/SiO2 catalysts for Fischer-Tropsch synthesis"; Fuel Processing Technology 89 (2008) 455-459.
(Continued)

*Primary Examiner* — Melvin C Mayes
*Assistant Examiner* — James Corno
(74) *Attorney, Agent, or Firm* — Renner, Otto, Boisselle & Sklar, LLP

(57) ABSTRACT

A method for the preparation of a modified catalyst support comprising: (a) treating a bare catalyst support material with an aqueous solution or dispersion of one or more titanium metal sources and one or more carboxylic acids; and (b) drying the treated support, and (c) optionally calcining the treated support. Also provided are catalyst support materials obtainable by the methods, and catalysts prepared from such supports.

20 Claims, 11 Drawing Sheets

(51) Int. Cl.
- *B01J 37/18* (2006.01)
- *B01J 37/02* (2006.01)
- *B01J 23/89* (2006.01)
- *C10G 2/00* (2006.01)
- *B01J 35/00* (2006.01)
- *B01J 37/08* (2006.01)
- *B01J 23/889* (2006.01)
- *B01J 35/02* (2006.01)
- *B01J 21/08* (2006.01)

(52) U.S. Cl.
CPC ....... *B01J 23/8913* (2013.01); *B01J 23/8986* (2013.01); *B01J 35/002* (2013.01); *B01J 35/023* (2013.01); *B01J 37/0205* (2013.01); *B01J 37/0207* (2013.01); *B01J 37/08* (2013.01); *B01J 37/18* (2013.01); *C10G 2/332* (2013.01)

(56) References Cited

U.S. PATENT DOCUMENTS

| | | |
|---|---|---|
| 2002/0098977 A1 | 7/2002 | Park et al. |
| 2003/0130361 A1* | 7/2003 | Lednor et al. ............... 518/715 |
| 2005/0026776 A1 | 2/2005 | Yamada et al. |
| 2005/0272827 A1* | 12/2005 | Lok .................. B01J 21/063 518/716 |
| 2006/0160695 A1* | 7/2006 | Zhou et al. .................. 502/152 |
| 2009/0111899 A1* | 4/2009 | Mauldin .................... 518/715 |
| 2009/0293359 A1 | 12/2009 | Simmons et al. |
| 2009/0305881 A1 | 12/2009 | Sietsma et al. |
| 2011/0028575 A1* | 2/2011 | Van De Loosdrecht et al. ........................ 518/715 |

FOREIGN PATENT DOCUMENTS

| | | |
|---|---|---|
| WO | 2007068731 | 6/2007 |
| WO | 2009055013 | 4/2009 |
| WO | 2010097754 | 9/2010 |
| WO | 2012107718 | 8/2012 |

OTHER PUBLICATIONS

International Search Report and Written Opinion, Application No. PCT/GB2013/050193, mailed Apr. 8, 2013.

* cited by examiner

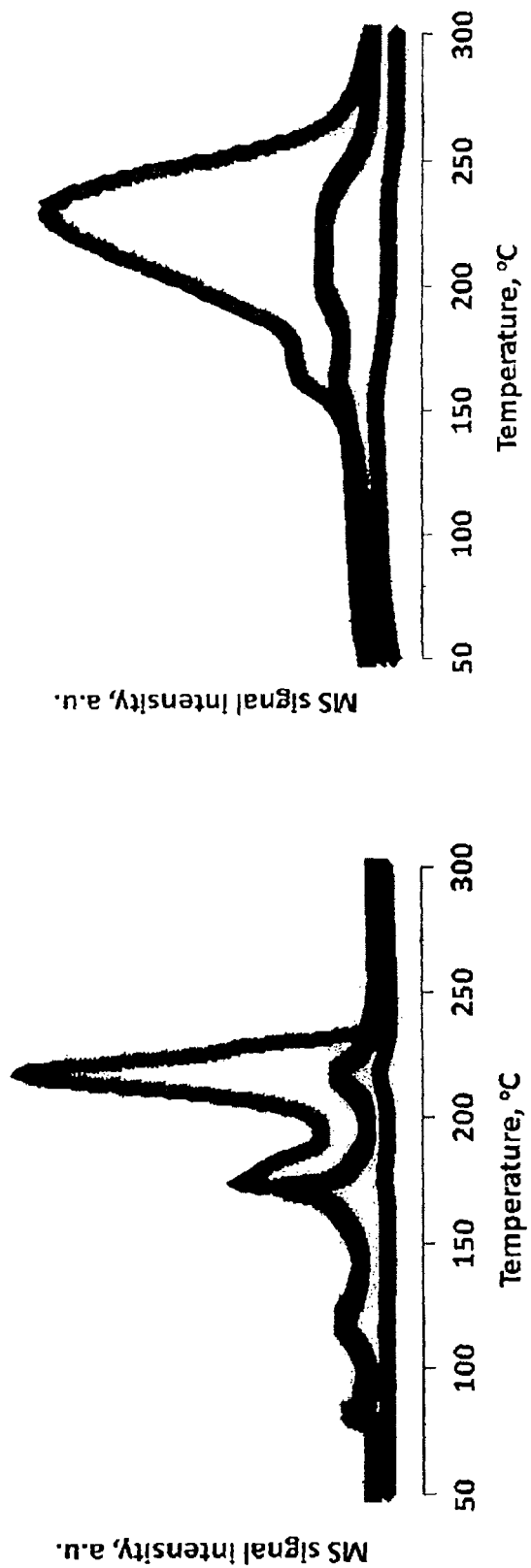

TREATING OF CATALYST CARRIER, FISCHER-TROPSCH CATALYSTS AND METHOD OF PREPARATION THEREOF

INTRODUCTORY PARAGRAPH

The present invention relates to a method for the preparation of a modified catalyst support and the catalyst supports formed using this method. The present invention also relates to catalyst precursors and catalysts formed on the modified catalyst support.

The supports, precursors and catalysts of the present invention are particularly suitable for use in Fischer-Tropsch reactions.

INTRO/BACKGROUND

All documents cited herein are incorporated by reference in their entirety.

The modification of catalyst supports has conventionally been carried out using organic solvents, as described in, for example, Bouh et al., J. Am. Chem. Soc, 121 (1999) 7201, Bu et al., Advanced Materials Research, 194 (2011) 1807 and US patent application US 2010/0024874 A1. In the modern era, there is a continual push towards more environmentally friendly, or "greener", technologies. This push has caused considerable interest in water-based processes in the catalyst manufacturing industry. Furthermore, the use of aqueous methods, compared to non-aqueous methods, often results in a lowering of manufacturing costs.

Therefore, there is a need for further aqueous methods for the preparation of modified catalyst supports.

U.S. Pat. No. 7,510,994 discloses a method of loading an oxide of titanium onto a support in film form in an amount of from 0.5 to 10% through impregnation with an aqueous solution containing compounds which act as titanium sources.

An object of the present invention is to provide an improved method for the preparation of an improved modified catalyst support.

A further object of the present invention is to provide improved modified catalyst supports, catalyst precursors and catalysts.

STATEMENT OF INVENTION

The present invention provides a method for the preparation of a modified catalyst support comprising (a) treating a bare catalyst support material with an aqueous solution or dispersion of one or more titanium metal sources and one or more carboxylic acids and (b) drying the treated support and (c) optionally calcining the treated support.

This method is advantageous for environmental reasons. In particular, aqueous methods are more environmentally friendly than non-aqueous methods because the by-products of aqueous methods are easier to dispose of safely and are less toxic.

This method is also advantageous because it provides a modified catalyst support which is more stable than modified catalyst supports produced by alternative methods, particularly methods in which one or more carboxylic acids are not used. This is also shown in the examples of this application.

This method is also advantageous because it provides a modified catalyst support which, when used to manufacture a catalyst, provides a more active catalyst as shown in the examples of this application.

The present invention also provides a modified catalyst support obtainable by the methods described herein.

The modified catalyst support of the present invention is advantageous because it is more stable than alternative supports. This is also shown in the examples of this application.

The modified catalyst support of the present invention is advantageous because it can be used to manufacture a more active catalyst as shown in the examples of this application.

The present invention also provides a method for preparing a catalyst precursor comprising (a) depositing a solution or suspension comprising at least one catalyst metal precursor and a complexing/reducing agent onto the modified catalyst support according to the present invention; (b) optionally drying the modified catalyst support onto which the solution or suspension has been deposited; and (c) calcining the modified catalyst support onto which the solution or suspension has been deposited.

The present invention also provides a catalyst precursor obtainable by the method according to this aspect of the invention. The present invention further provides a catalyst precursor comprising the modified catalyst support according to the invention.

A catalyst precursor comprising the modified catalyst support of the present invention is advantageous because it is more stable than a catalyst precursor comprising a modified catalyst support synthesised by alternative methods. This is shown in the examples of this application.

A catalyst precursor comprising the modified support of the present invention is advantageous because it can be activated to provide a more active catalyst as shown in the examples of this application.

The present invention also provides a catalyst obtainable by activation of the catalyst precursor according to these aspects of the invention.

A catalyst comprising the modified catalyst support of the present invention is advantageous because it is a more active catalyst as shown in the examples of this application.

In addition, a catalyst comprising the modified catalyst support of the present invention is advantageous because it has a lower deactivation rate (i.e. is more stable) compared to catalysts comprising alternative modified catalyst supports. This is shown in the examples of this application.

The present invention also provides the use of the modified catalyst support according to the present invention as a substrate in the manufacture of a Fischer-Tropsch catalyst.

The present invention also provides the use of a catalyst comprising the modified catalyst support according to the present invention to catalyse a Fischer-Tropsch reaction.

The present invention also provides the use of the catalyst precursor according to the present invention to form a Fischer-Tropsch catalyst.

The present invention also provides the use of the activated catalyst according to the present invention to catalyse a Fischer-Tropsch reaction.

The present invention also provides a method of conducting a Fischer Tropsch reaction (or Fischer Tropsch Synthesis (FTS)) comprising using a catalyst according to the present invention or a catalyst derived from a catalyst precursor according to the present invention in a microchannel reactor, in which the performance of the catalyst is substantially maintained over a reaction period of about 5000 hours or more without regeneration of the catalyst, such that the contact time is less than 500 milliseconds, the CO conversion is greater than 50% and the methane selectivity is less than 15%. In particular, the reaction period may be 8000 hours or more. Preferably, the reaction is carried out in a microchannel reactor.

The present invention also provides a method of conducting a Fischer Tropsch reaction comprising using a catalyst according to the present invention or a catalyst derived from a catalyst precursor according to the present invention, in which the deactivation rate of the catalyst measured as percent loss of CO conversion per day is 0.09% or less over a reaction period of about 5000 hours or more. In particular, the reaction period may be 8000 hours or more. Preferably, the reaction is carried out in a microchannel reactor.

Support Modification Method

As used herein, the term "modified catalyst support" means a catalyst support whose structure and/or composition has been altered from the bare catalyst support material by the incorporation of a refractory solid oxide in at least a part of the volume of the support material. The term "bare catalyst support" refers to a catalyst support material that is substantially free of catalytic metals, i.e. platinum group metals, iron, nickel, copper or cobalt. Suitable bare catalyst support materials are silica or refractory oxides, for example refractory oxides of Mg, Si, Ti, Zn, Al, Zr, Hf, Y or Ce or mixtures thereof. In other embodiments the catalyst support material may comprise or consist essentially of carbon, a zeolite, a boronitride or silicon carbide. If the bare catalyst support material is also a refractory solid oxide, the refractory solid oxide which modifies the structure or composition of the bare catalyst support material will suitably be different to the bare catalyst support material. A catalyst may then be affixed to the modified catalyst support.

As used herein, the term "treating" when referring to the treating of a bare catalyst support material with the aqueous solution described herein means a method of including a modifying material on or in the bare catalyst support material. Treating includes such methods as impregnating, coating, brushing, spraying, rolling or spreading. The preferred method of treating used is impregnation, for example by spraying.

The bare catalyst support material may be in the form of a structured shape, pellets or a powder.

The refractory solid oxide which modifies the bare catalyst support material comprises or consists of a titanium metal oxide.

Preferably, the modified catalyst support is a titania-modified silica support.

Treating of the bare catalyst support material with the modifying material may involve spraying the bare support material into the aqueous treatment solution one or more times (e.g. 1, 2, 3, 4, 5, 6, 7, 8, 9, 10 or more times). As used herein, the "aqueous treatment solution" is the aqueous solution or dispersion comprising one or more titanium metal sources and one or more carboxylic acids as described in claim 1.

Each spraying of the support material may last from about 5 minutes to about 1 hour, preferably from about 15 minutes to about 30 minutes. Typically spraying of the basic support material takes place at a temperature of 30° C. or less. The volume of the solution or dispersion taken up by the bare catalyst support in the process may suitably range from about 0.5 to about 2.50 ml per gram of bare support material.

The aqueous treatment solution is an aqueous solution or dispersion comprising one or more titanium metal sources and one or more carboxylic acids.

The term "aqueous" herein refers to solutions or suspension of the reagents in a solvent or solvent mixture that is predominantly (i.e. more than 50%, suitably more than 80%, for example more than 95%, and most typically about 100%) water. Preferably the aqueous treatment solution comprises from about 68% w/v to about 88% w/v water, preferably from about 70% w/v to about 75% w/v water.

Suitably, the titanium metal source may be present as a water soluble titanium metal ion complex or water soluble compound, preferably a complex. The titanium metal source may comprise one or more different titanium metals. The term "water soluble" herein signifies a solubility in water of at least about 10 g/liter to form a solution that is stable against precipitation for at least about one hour.

Suitable titanium metal sources include soluble complexes of a titanium metal with an organic complexing/reducing agent. The organic complexing/reducing agents may be mono-, bi- or tridentate. Suitable organic complexing/reducing agents include alcohols, aldehydes, ketones, amino acids, amides, ureas, carboxylic acids and mixtures thereof. Suitably, the soluble titanium metal source is substantially or completely free of sulphur and/or halide, since these could react adversely with the substrate, catalytic metal and/or metal promoter. Likewise, suitably the soluble titanium metal source is suitably substantially free of metals other than the titanium metal (e.g. sodium or potassium counter-ions) since these could react adversely with the substrate, catalytic metal and/or metal promoter. Thus, for example, the titanium metal compound is suitably a soluble complex of the titanium metal with one or more organic ligands comprising only C, H, O and/or N and any counterions are selected from organic counterions, ammonium counterions, and carbonate counterions.

An example of a suitable titanium metal complex is titanium (IV) bis (ammoniumlactato) dihydroxide (TALH).

The one or more titanium metal sources may be present in the aqueous treatment solution in an amount of about 30% w/v to about 45% w/v, preferably about 40% w/v to about 45% w/v. Where the titanium metal complex is TALH, the concentration is preferably from about 40% w/v to about 45% w/v.

One or more carboxylic acids are present in the aqueous treatment solution. The carboxylic acids are organic acids that are soluble in water.

Suitable carboxylic acids may be branched, linear or unbranched, saturated, unsaturated, aliphatic and/or aromatic, and/or derivatives thereof. Suitably, the carboxylic acid comprises or consists essentially of one or more dicarboxylic or tricarboxylic acids. Alternatively or in addition, the carboxylic acid may comprise one or more alpha- or beta-hydroxyl carboxylic acids. Examples of suitable carboxylic acids include citric acid, tartaric acid, malic acid, maleic acid, lactic acid, glycolic acid, propionic acid, succinic acid, oxalic acid and combinations thereof.

Mixtures or one of more different carboxylic acids may be used. In one embodiment, the mixture of one or more different carboxylic acids includes a tricarboxylic acid, preferably citric acid. In an alternative embodiment, the mixture of one or more different carboxylic acids includes an alpha hydroxyl carboxylic acid, such as lactic acid. In a further alternative embodiment, the mixture of one or more different carboxylic acids includes a tricarboxylic acid, preferably citric acid, and an alpha hydroxyl carboxylic acid, preferably lactic acid.

Preferred carboxylic acids are lactic acid, citric acid and mixtures thereof. In one embodiment, citric acid must be present in the aqueous treatment solution. Without wishing to be bound by theory, the inventors believe that the one or more carboxylic acids, particularly citric acid, in the aqueous treatment solution act as ligands to the titanium metal source thereby changing the coordination sphere around the titanium metal. The carboxylic acid is also thought to replace OH groups on the bare catalyst support material (e.g. silica) forming dimeric and oligomeric titanium metal species on the surface of the bare catalyst support material leading to a higher dispersion of the titanium metal species over the bare catalyst support material surface. This is thought to lead to the increased stability of a catalyst manufactured with the modified catalyst support.

The one or more carboxylic acids may be present in the aqueous treatment solution in an amount of about 5% w/v to about 20% w/v, preferably from about 18% w/v to about 20% w/v, more preferably from about 18% w/v to about 19% w/v.

Preferably, the aqueous treatment solution consists of a titanium precursor, a carboxylic acid and water. Preferably, the aqueous treatment solution has a pH of from about 3.0 to about 3.5. A particularly preferred aqueous treatment solution has from about 40% w/v to about 45% w/v of TALH, from about 18% w/v to about 20% w/v of citric acid, the remainder water and a pH of from about 3.0 to about 3.5.

Suitable complexing/reducing agents for use in the method of making the catalyst precursor of the present invention are polar organic solvents such as urea and carboxylic acids, wherein the carboxylic acids may be citric acid, glycolic acid, propionic acid, succinic acid, lactic acid or oxalic acid. Preferably the polar organic solvent is a carboxylic acid. Preferably the polar organic solvent is citric acid. Mixtures of complexing/reducing agents may also be used.

The treated support may be dried and optionally calcined following treatment. The purpose of the drying step and optional calcining step includes driving off water, which has an effect of increasing the support pore volume as compared to the just-impregnated state. Additionally, the metal oxide precursor and the polar organic compound may be partially decomposed during the heat treatment (although ideally not fully converted to the metal oxide). Without wishing to be bound by theory, the inventors feel that the presence of residual organic species on the catalyst support assists in the later dispersion of cobalt and thus may help improve the stability of the resulting catalyst.

One way of measuring the amount of residual organic species on the modified support is by determining the weight of the modified support after the drying and optional calcining steps and comparing this to the nominal weight of the support after full conversion to the metal oxide and removal of all water and precursor and polar organic compound species. The weight after drying/calcining should be higher than the nominal fully oxidised weight, indicating the presence of some additional species (presumed residual organic moieties). Suitable ranges for the weight ratio (weight after drying/calcining: nominal fully oxidised weight) may be 1.01 to 1.50, preferably 1.05 to 1.30, more preferably 1.10 to 1.25.

A suitable temperature for the drying step and optional calcining step is determined by identifying the temperature of decomposition of the metal oxide precursor plus polar organic compound mixture and selecting a temperature less than this. Suitably, the drying step and optional calcining step are carried out at a temperature from 100 to 350° C., from 150 to 300° C., or from 225 to 275° C.

The drying step may take place in a box furnace. Where a box furnace is used, preferably drying takes place by heating at a temperature that increases at a rate (known as a "ramp rate") of 2° C./min up to a temperature of 100° C. and the temperature is then held at 100° C. for about 5 hours. Alternatively, drying may take place in other equipments, such as in a cone blender or in a rotary calciner. Where a rotary calciner is used, preferably the ramp rate is higher than 2° C./min and the holding time is shorter than 5 hours.

The treated support may be calcined following treatment. Calcining may increase stability of a catalyst manufactured with the modified catalyst support. Calcination may use a programmed heating regime which increases the temperature gradually so as to control gas and heat generation from the treated support and the other components of the treatment solution. A preferred heating regime has a final temperature of up to 250° C. Preferably, the temperature ramp rate is 2° C./min. The final temperature should not exceed about 250° C. because calcining at higher temperatures reduces the amount of carbon and nitrogen retained on the modified support after drying and calcination, which has the effect of reducing catalyst stability. During calcination of the treated support, the final temperature is preferably held for about 5 hours. Typically, after calcination the modified catalyst support contains from about 5% to about 15% carbon, preferably from about 6% to about 7% carbon, and from about 1% to about 1.5% nitrogen.

The modified catalyst support of the present invention is preferably a modified Fischer-Tropsch catalyst support.

Modified Catalyst Support

The present invention further provides a catalyst support obtainable by the method of the present invention.

$TiO_2$ (titania) increases the stability (e.g. by decreasing deactivation) of a silica-supported catalyst. The deactivation rate of the catalyst may thus be such that it can used in a Fischer-Tropsh synthesis for e.g. >300 hours.

At elevated temperatures, the catalyst material may react with the surface Si—OH groups on a silica support to generate silicate species which are not Fischer-Tropsch active and may not be readily reducible. This may lead to a loss in active surface area of the catalyst and therefore a drop in FTS activity.

Without wishing to be bound by theory, the inventors believe that dispersion of titania onto a silica surface occurs via consumption of the surface Si—OH groups with the subsequent forming of bridging Ti—O—Si bonds. Thus, modification of a silica support with a layer of titania removes the Si—OH groups and thereby prevents the formation of silicates.

$TiO_2$ may comprise at least 11 wt %, or greater than 11 wt %, of the total weight of the catalyst support. In particular, the catalyst support may comprise 11-30 wt %, 11-25 wt %, 11-20 wt %, or 12-18 wt %, or 15-17 wt %, or about 16 wt % $TiO_2$ on silica ($SiO_2$).

Deactivation Rate

The catalyst may be used for an extended period (e.g. >300 hours) with a deactivation rate of less than 0.25% per day, or between 0.001% and 0.20% per day, or between 0.01 and 0.05% per day, or about 0.02% per day in a microchannel reactor tested using Test Method A as described herein.

Preferably, a catalyst of the present invention tested using Test Method A described in the description has a deactivation rate in a microchannel reactor measured as percent loss of CO conversion per 24 hours of less than 0.25, wherein the CO conversion is greater than 70%, preferably greater than 75%, more preferably greater than 80%, wherein said loss is measured over a period of 200 hours or more, and wherein said period of 200 hours starts at a time on stream (TOS) of less than 500 hours.

FTS Testing in Microchannel Reactor—"Test Method A"
Apparatus:

The Fischer-Tropsch reaction is conducted in a stainless-steel microchannel reactor with a process gap of 1 mm, a width of 0.6 cm and a sufficient length for including a 1.9 cm long SiC bed placed upstream of the catalyst bed of length 61.6 cm. Two coolant channels of dimensions 0.2 cm×1.27 cm run along the entire length on either side of the process channel. A hot oil (Marlotherm SH) is flowed in both the coolant channels, co-current to the direction of flow of syngas, using a Julabo pump at a minimum flow rate of 8 LPM. The reactor temperature is measured by a set of Omega K-type thermocouples installed in the metal web between the process and coolant channels.

Catalyst Loading:

The catalyst is ground and sieved to obtain a target size fraction of 106×212 microns. The SiC used as an inert is washed, ground and sieved to the same particle size range. The packed apparent bed density (PABD) of both these materials is measured ex-situ using automated tap density analyzers (e.g. Autotap—Quantachrome Instruments, GeoPyc—Micromeritics Instrument Corporation) or standard densification protocol of using a vibrating table. After installing the retention assembly at the reactor outlet, the catalyst is first loaded to a bed length of 61.6 cm followed by SiC to top off the process channel, using appropriate bed densification techniques. The packing density of the catalyst and SiC in the microchannel should be within +5% of the ex-situ measured PABD. This is followed by the installation of the catalyst retention assembly at the reactor inlet.

Experimental Details:

The reactor is installed in the test stand and appropriate connections for feeding the syngas, hot oil, etc., are made.

Catalyst Activation:

1) The reactor, as installed, is under ambient conditions of temperature and pressure
2) Set nitrogen (>99.99%) flow to a gas hourly space velocity (GHSV) of 1300 hr$^{-1}$ based on the loaded volume of catalyst in the reactor (3.353 ml)
3) Purge the reactor with nitrogen for a period of 1 hr
4) Replace nitrogen feed with hydrogen (>99.9%) at the same GHSV of 1300 hr$^{-1}$
5) Purge the reactor with hydrogen for a period of 1 hr
6) Starting at ambient temperature, heat the reactor to a target temperature of 400° C. at a rate of 60° C./hr (using ceramic heater and/or heat tapes as necessary)
7) The maximum temperature spread across the reactor of the reactor should be within +5° C. as measured by the difference between the maximum and the minimum reading of the thermocouples
8) The reactor is held under these reducing conditions for period of 2 hrs
9) Upon completion of this hold, the reactor is cooled to a temperature of 170° C. at a rate of 60° C./hr
10) Calculate the time elapsed from the start of the heat-up (step 6). If this time is less than 14 hrs, continue to hold the reactor under flowing hydrogen.

Start-Up:

11) Turn ON the Julabo pump to start the circulation of hot oil at 170° C.
12) Switch the reactor feed to syngas with a composition of ($H_2$:CO=2.0, $N_2$ dilution=16.5%) at the target GHSV of 12,400 hr$^{-1}$
13) Purge the reactor with syngas for a period of 1 hr
14) Pressurize the reactor from close to ambient pressure to an inlet pressure of 350 psig at a rate of 150 psig/hr
15) Heat the reactor to a target reaction temperature of 210° C. at a rate of 1.5° C./hr using the hot oil
16) Hold the reactor at this condition for a period of minimum 400 hrs
17) During this period, monitor the CO conversion in the reactor by measuring the tail gas flow and composition from the reactor outlet Deactivation Rate Calculation:

18) The CO conversion can be calculated as:

$$X_{CO} = 1 - \frac{\text{Flow Out} \times CO\ conc}{CO\ \text{Flow In}}$$

19) Plot the CO conversion as a function of time on stream for a period from 100 hours-on-stream (since the start of step 15) to 400 hours-on-stream
20) Use linear regression to obtain the slope of curve in terms of a (linear) deactivation rate of % CO conversion per day Method of Preparation of Catalyst Precursor A method for preparing a catalyst precursor may comprise (a) depositing a solution or suspension comprising at least one catalyst metal precursor and a complexing/reducing agent onto the modified catalyst support of the present invention; (b) optionally drying the modified catalyst support onto which the solution or suspension has been deposited; and (c) calcining the modified catalyst support onto which the solution or suspension has been deposited.

Other methods for the preparation of catalyst precursors may be found in WO 2008/104793.

The catalyst metal precursor may be a cobalt-containing precursor or an iron-containing precursor. In one embodiment, the catalyst metal precursor is a cobalt-containing precursor.

Suitable cobalt-containing precursors include cobalt benzoylacetonate, cobalt carbonate, cobalt cyanide, cobalt hydroxide, cobalt oxalate, cobalt oxide, cobalt nitrate, cobalt acetate, cobalt acetylacetonate and cobalt citrate. These cobalt precursors can be used individually or in combination. These cobalt precursors may be in the form of hydrates or in anhydrous form. In some cases, where the cobalt precursor is not soluble in water, such as cobalt carbonate or cobalt hydroxide, a small amount of nitric acid or a carboxylic acid may be added to enable the precursor to fully dissolve in an aqueous solution or suspension.

In one embodiment, the catalyst metal precursor is cobalt nitrate. Cobalt nitrate may react with a complexing/reducing agent, such as citric acid, during calcination to produce $Co_3O_4$.

The citric acid may act as a complexing/reducing agent and/or as a fuel (i.e. reducing agent for cobalt nitrate) in the calcination reaction.

Preferably, the catalyst precursor comprises cobalt on the modified catalyst support. More preferably, the catalyst precursor comprises $Co_3O_4$ on the modified catalyst support.

The numerical average particle diameter of the $Co_3O_4$ on the modified catalyst support can be determined by X-ray diffraction (XRD).

The c value of a lognormal particle size distribution of $Co_3O_4$ (known as "the dimensionless ratio") can be calculated. Alternatively or in addition, the D-value of the lognormal particle size distribution of $Co_3O_4$ can also be calculated. The D-value is a reformulation of the size distribution as described by the c-value and does not represent any new data. Therefore, the c- and D-values are mathematically related. It is preferred to use the D-value as this number incorporates both the size and distribution width into a single metric.

Without wishing to be bound by theory, the inventors believe that the activity and the selectivity of cobalt-based catalysts are principally influenced by the density of active sites, favouring very small particle sizes. However, the deactivation mechanisms of cobalt catalysts follow in general the reverse trend, where the largest particles are the most stable.

The inventors have further found that the cobalt oxide particle size distribution influences the catalyst's activity and stability, such that, a particle size distribution as narrow as possible is preferred. The width of the particle size distribution can be measured by the c value of the lognormal particle size distribution.

c is known as the dimensionless ratio, and characterises the width of the size distribution.

In a sample of calcined catalyst (assuming spherical particles equivalent to crystallites or crystallites with a lognormal monomodal distribution) the form of the particle size distribution may be written as:

$$f(R) = \frac{1}{R\sqrt{2\pi \ln(1+c)}} e^{-\frac{\left[\ln\left(\frac{R}{R_0}\sqrt{1+c}\right)\right]^2}{2}} \qquad \text{Equation 1}$$

where $$c = \frac{\sigma^2}{R_O^2}$$

where $R_O$ is the numeric average particle radius and c, which is known as the dimensionless ratio, characterises the width of the size distribution. Multiplication of $R_O$ by 2 yields the numerical average particle diameter.

An alternative way to characterise the relationship between the $Co_3O_4$ particle size distribution and the catalyst's activity and stability is through the D-value. It is important to note that the D-value is simply a reformulation of the size distribution as described by the c-value and does not represent any new data. Therefore, the c- and D-values are mathematically related, but an improved correlation is seen between the D-value and the catalyst's activity and stability.

The D-value is calculated from parameters of the particle size distribution of $Co_3O_4$ particles in a fresh, unreduced catalyst, i.e. in a catalyst precursor Trends between the c-value and the deactivation rate can be seen for $Co_3O_4$ particles of substantially the same numerical average particle diameter. The D-value is an improvement on the c-value because, while it still takes into account both the width of the $Co_3O_4$ particle size distribution and the numerical average particle diameter, it places a larger weighting on the numerical average $Co_3O_4$ particle diameter, which removes the need to maintain substantially the same numerical average particle diameter in order to observe trends in the data. This enables a single metric (D-value) to be reported and compared, rather than two metrics (c-value and numerical average particle diameter).

The D-value may be calculated by plotting the lognormal particle size distribution using Equation 1. The frequency at the mode of this lognormal distribution ($f_{mode}$) may be considered to be a measure of the width of the distribution. In order to account for the dependence of the FTS catalyst stability on numerical average particle diameter, the inventors have developed a formula in which $f_{mode}$ is weighted by the size distribution median to create a "size-weighted distributed breadth", or D-value, using the formula:

$$D = f_{mode}{}^y \times R_O \times 2 \qquad \text{Equation 2}$$

wherein $f_{mode}$ is the frequency at the mode of the lognormal distribution, $R_O$ is the numeric average particle radius, and y is an empirical value based on experimental observation. The value of y is determined via comparison of the stability of a selection of catalysts (at least about 5 to 10) with substantially similar compositions but small variations in $Co_3O_4$ particle size and size distribution width. These variations may be achieved via minor modifications of the synthesis method e.g. increasing the dilution of the impregnation solution (which is shown in an example to cause subtle changes to the particle size distribution). FTS stability data on these catalysts under the same testing conditions is then collected. Within this set of similar catalysts, y is then manually adjusted to create a spread of D-values such that the difference in the stability of the FTS catalysts can be distinguished.

Therefore, an increase in the D-value represents either a narrowing of the particle size distribution or an increase in the numerical average particle diameter.

The solution or suspension may contain a mixture of the primary catalyst metal precursor (i.e. a cobalt-containing precursors or an iron-containing precursor) and at least one secondary catalyst metal precursor. Such secondary catalyst metal precursor(s) may be present to provide a promoter and/or modifier in the catalyst. Suitable secondary catalyst metals include noble metals, such as Pd, Pt, Rh, Ru, Ir, Au, Ag and Os, transition metals, such as Zr, Ti, V, Cr, Mn, Fe, Co, Ni, Cu, Zn, Nb, Mo, Tc, Cd, Hf, Ta, W, Re, Hg and Ti and the 4f-block lanthanides, such as La, Ce, Pr, Nd, Pm, Sm, Eu, Gd, Tb, Dy, Ho, Er, Tm, Yb and Lu.

In particular, the secondary catalyst metals may be one or more of Pd, Pt, Ru, Ni, Co (if not the primary catalyst metal), Fe (if not the primary catalyst metal), Cu, Mn, Mo, Re and W.

Suitable complexing/reducing agents for use in the method of making the catalyst precursor of the present invention are polar organic solvents such as urea and carboxylic acids, wherein the carboxylic acids may be citric acid, glycolic acid, propionic acid, succinic acid, lactic acid or oxalic acid. Preferably the polar organic solvent is a carboxylic acid. Preferably the polar organic solvent is citric acid. Mixtures of complexing/reducing agents may also be used.

If a catalyst metal precursor which is a hydrate is used, the solution or suspension will necessarily contain some water of hydration. This water may be sufficient to dissolve some of the components of the solution or suspension, such as the complexing/reducing agent (if solid at room temperature). However, in some cases, it may be necessary to add some water to the solution or suspension in order to ensure that the catalyst metal precursor(s) and the other components are able to dissolve or become suspended. In such cases, the amount of water used is usually the minimum required to allow the catalyst metal precursor(s) and the other components to dissolve or be suspended.

As will be clear to the skilled person, the choice of complexing/reducing agent will be partly dictated by the aqueous/non-aqueous nature of the solution or suspension. For example, if the solution or suspension is aqueous, a citric acid complexing/reducing agent is preferred because it provides a highly stable catalyst compared to other organic complexing/reducing agents such as polyols and sugars. The use of citric acid is also preferred because it provides a catalyst which is selective and stable at CO conversion levels greater than 70%.

The use of an aqueous method for the preparation of a modified catalyst support in combination with an aqueous method for the preparation of the catalyst precursor is advantageous for environmental reasons. In particular, aqueous methods are more environmentally friendly than non-aqueous methods because the by-products of aqueous methods are easier to dispose of safely and are less toxic. For example, most organic solvents are highly flammable and have low boiling points. As such, the vapours of these organic solvents tend to escape through the exhaust without decomposing. An effect of this is that manufacturing plants need to have extra safety measures in addition to COx and NOx scrubbers.

Optionally, the modified catalyst support onto which the solution or suspension has been deposited may be dried. Drying may take place at a temperature in the range from about 100° C. to about 130° C., preferably from about 100° C. to about 120° C. Drying may take place in a box oven, furnace or rotary calciner. Preferably drying takes place by heating at a temperature that increases at a ramp rate of 2° C./min up to a temperature of 100° C. and the temperature is then held at 100° C. for about 5 hours.

The modified catalyst support onto which the solution or suspension has been deposited may be calcined at a temperature in the range from about 200° C. to about 350° C., preferably from about 200° C. to about 250° C. Calcining may take place in a box oven, furnace or rotary calciner. Preferably, calcining takes place by heating at a temperature that increases at a ramp rate of 2° C./min up to a final temperature of 250° C. The temperature is held at 250° C. for about 3 hours. Alternatively, calcining preferably takes place by heating at a temperature that increases at a ramp rate of 2° C./min up to a temperature of 200° C. The temperature is held at 200° C. for about 3 hours before being increased again at a ramp rate of 1° C./min up to a temperature of 250° C. and then held at that temperature for a further 3 hours. The final temperature should not exceed about 250° C. because calcining at higher temperatures reduces the amount of carbon and nitrogen retained on the modified support after drying and calcination, which has the effect of reducing catalyst stability.

The deposition, drying and calcination steps may be repeated one or more times. For each repeat, the solution or suspension used in the deposition step may be the same or different. If the solution or suspension in each repetition is the same, the repetition of the steps allows the amount of catalyst metal(s) to be brought up to the desired level on the modified catalyst support stepwise in each repetition. If the solution or suspension in each repetition is different, the repetition of the steps allows schemes for bringing the amounts of different catalyst metals up to the desired level in a series of steps to be executed.

A programmed heating regime may be used during drying and calcination which increases the temperature gradually so as to control gas and heat generation from the catalyst metal precursors and the other components of the solution or suspension.

During the heating processes, the catalyst support may reach a maximum temperature of no more than 500° C., or no more than 375° C., or no more than 250° C. at atmospheric pressure.

The temperature may be ramped up at a rate of from 0.0001 to 10° C. per minute, or from 0.1 to 5° C. per minute.

An illustrative programmed heating regime may comprise:
(a) heating the catalyst support onto which the solution or suspension has been deposited at a rate of 1 to 10, or about 1 to 5, or about 2° C. per minute to a temperature of 80 to 120° C., or about 100° C. and maintaining it at this temperature for 0.25 to 10, or about 1 to 10, or about 5 hours;
(b) heating it at a rate of 1 to 10, or about 1 to 5, or about 2° C. per minute to a temperature of 150 to 400° C., or 200 to 350° C., or about 250° C. and maintaining it at this temperature for 0.25 to 6, or about 1 to 6, or about 3 hours.

The heating steps can be carried out in a rotating kiln, in a static oven or in a fluidised bed. Preferably, the heating steps are carried out in a rotating kiln because generally this has a more even temperature profile than a static oven.

Once the calcination step has been completed, either after the steps are first carried out or at the end of a repetition, further catalyst metals may optionally be loaded onto the catalyst support.

The calcination step may be carried out in an oxygen-containing atmosphere (e.g. air), in particular if metal catalyst oxides are to be formed.

Catalyst Precursor

A catalyst precursor is a material that may be activated to form a catalyst. The terms "catalyst" and "catalyst precursor" are used herein interchangeably and will be understood accordingly to their specific context.

A catalyst precursor comprises at least one catalyst metal, such as cobalt or iron, which may be present in oxide form, as elemental metal or as a mixture of any of these. In particular, the catalyst precursor may comprise from 10 to 60% cobalt and/or iron (based on the weight of the metal as a percentage of the total weight of the catalyst precursor), or from 35 to 50% of cobalt and/or iron, or from 40 to 44% of cobalt and/or iron or about 42% of cobalt and/or iron. The catalyst precursor may comprise both cobalt and iron, or it may not comprise iron. The cobalt may be present as $Co_3O_4$.

The catalyst precursor may comprise a noble metal on the support that may be one or more of Pd, Pt, Rh, Re, Ru, Ir, Au, Ag and Os. In particular, the noble metal may be selected from the group consisting of Ru, Re or Pt, and mostsuitably it comprises Pt. The catalyst precursor may suitably comprise from about 0.01 to about 1% in total of noble metal(s) (based on the total weight of all noble metals present as a percentage of the total weight of the catalyst precursor), or from about 0.015 to about 0.5% in total of noble metal(s), or from about 0.02 to about 0.3% in total of noble metal(s).

If desired, the catalyst precursor may include one or more other metal-based components as promoters or modifiers. These metal-based components may also be present in the catalyst precursor at least partially as oxides or elemental metals. A suitable metal for the one or more other metal-based components is one or more of Zr, Ti, V, Cr, Mn, Ni, Cu, Zn, Nb, Mo, Tc, Cd, Hf, Ta, W, Re, Hg, Tl and the 4f-block lanthanides. Suitable 4f-block lanthanides are La, Ce, Pr, Nd, Pm, Sm, Eu, Gd, Tb, Dy, Ho, Er, Tm, Yb and Lu. In particular, the metal for the one or more other metal-based components may be one or more of Zn, Cu, Mn, Mo and W. Alternatively, the metal for the one or more other metal-based components may be one or more of Re and Pt. The catalyst precursor may comprise from 0.01 to 10% in total of other metal(s) (based on the total weight of all the other metals as a percentage of the total weight of the catalyst precursor), or from 0.1 to 5% in total of other metals, or about 3% in total of other metals.

The catalyst precursor may contain up to 10% carbon (based on the weight of the carbon, in whatever form, in the catalyst as percentage of the total weight of the catalyst precursor), or from 0.001 to 5% of carbon, or about 0.01% of carbon. Alternatively, the catalyst precursor may comprise no carbon.

Optionally, the catalyst precursor may contain a nitrogen-containing organic compound such as urea, or an organic ligand such as an amine or a carboxylic acid, such as citric acid or acetic acid, which may be in the form of a salt or an ester.

The precursor may be activated to produce a Fischer-Tropsch catalyst, for instance by heating the catalyst precursor in hydrogen and/or a hydrocarbon gas, or in a hydrogen gas diluted with another gas, such as nitrogen and/or methane, to convert at least some of the oxides to elemental metal. In the active catalyst, the cobalt or iron may optionally be at least partially in the form of its oxide.

Catalyst Activation

The catalyst precursor may be activated by any of the conventional activation processes. For instance, the catalyst precursor may be activated using a reducing gas, such as hydrogen, a gaseous hydrocarbon, a mixture of hydrogen and a gaseous hydrocarbon (e.g. methane), a mixture of gaseous hydrocarbons, a mixture of hydrogen and gaseous hydrocarbons, a mixture of hydrogen and nitrogen, syngas, or a mixture of syngas and hydrogen.

The gas may be at a pressure of from 1 bar (atmospheric pressure) to 100 bar, or at a pressure of less than 30 bar.

The catalyst precursor may be heated to its activation temperature at a rate of from 0.01 to 20° C. per minute. The activation temperature may be no more than 600° C., or no more than 400° C.

The catalyst precursor may be held at the activation temperature for from 2 to 24 hours, or from 8 to 12 hours.

After activation, the catalyst may be cooled to a desired reaction temperature.

The catalyst, after activation, may be used in a Fischer-Tropsch process. This process may be carried out in a fixed bed reactor, a continuous stirred tank reactor, a slurry bubble column reactor or a circulating fluidized bed reactor. This process may be carried out in a microchannel reactor (or "microreactor").

The Fischer-Tropsch process is well known and the reaction conditions can be any of those known to the person skilled in the art, for instance the conditions discussed in WO 2008/104793. For example the Fischer-Tropsch process may be carried out at a temperature of from 150 to 300° C., or from 200 to 260° C., a pressure of from 1 to 100 bar, or from 15 to 25 bar, a $H_2$ to CO molar ratio of from 1.2 to 2.2 or 1.5 to 2.0 or about 1.8, and a gaseous hourly space velocity of from 200 to 5000, or from 1000 to 2000.

In a Fischer Tropsch reaction carried out in a microchannel reactor comprising using a catalyst according to the present invention or a catalyst derived from a catalyst precursor according to the present invention, the performance of the catalyst is substantially maintained over a reaction period of about 5000 hours or more without regeneration of the catalyst, such that the contact time is less than 500 milliseconds, the CO conversion is greater than 50% and the methane selectivity is less than 15%.

The reaction period may be 8000 hours or more. Preferably, the reaction is carried out in a microchannel reactor.

The reaction period of 5000 hours or more, preferably 8000 hours or more may be continuous or interrupted.

By "performance of the catalyst is substantially maintained" is meant that the average contact time, the average CO conversion and the average methane selectivity parameters during the reaction period are in the ranges described above. Additionally, the reaction period may be divided into one or more data collection intervals and the average contact time, the average CO conversion and the average methane selectivity parameters during each data collection interval may be in the ranges described above. The data collection intervals may be, for example, 24 hours, 12 hours, 6 hours, 3 hours or 1 hour in duration. In particular, the data collection interval is 1 hour. In this way, although there may be minor variations of these parameters, the overall performance of the catalyst in terms of the contact time, CO conversion and methane selectivity is still considered to be maintained.

The "contact time" is derived from the volume of a reaction zone within a microchannel divided by the volumetric feed flow rate of the reactants at a temperature of 0° C. and a pressure of one atmosphere.

In a Fischer Tropsch reaction comprising using a catalyst according to the present invention or a catalyst derived from a catalyst precursor according to the present invention, the deactivation rate of the catalyst measured as percent loss of CO conversion per day is 0.09% or less over a reaction period of about 5000 hours or more. In particular, the reaction period may be 8000 hours or more. Preferably, the reaction is carried out in a microchannel reactor. The reaction period may be continuous or interrupted.

As used herein the term "microchannel reactor" refers to an apparatus comprising one or more process microchannels wherein a reaction process is conducted. The process may comprise any chemical reaction such as a Fischer-Tropsch Synthesis (FTS) process. When two or more process microchannels are used, the process microchannels may be operated in parallel. The microchannel reactor may include a manifold for providing for the flow of reactants into the one or more process microchannels, and a manifold providing for the flow of product out of the one or more process microchannels. The microchannel reactor may further comprise one or more heat exchange channels adjacent to and/or in thermal contact with the one or more process microchannels. The heat exchange channels may provide heating and/or cooling for the fluids in the process microchannels. The heat exchange channels may be microchannels. The microchannel reactor may include a manifold for providing for the flow of heat exchange fluid into the heat exchange channels, and a manifold providing for the flow of heat exchange fluid out of the heat exchange channels. Examples of microchannel reactors are as described in WO 2009/126769, WO 2008/030467, WO 2005/075606 and U.S. Pat. No. 7,084,180 B2.

The depth of each microchannel may be in the range of about 0.05 to about 10 mm, or from about 0.05 to about 5 mm, or from about 0.05 to about 2 mm, or from about 0.1 to about 2 mm, or from about 0.5 to about 2 mm, or from about 0.5 to about 1.5 mm, or from about 0.08 to about 1.2 mm. The width of each microchannel may be up to about 10 cm, or from about 0.1 to about 10 cm, or from about 0.5 to about 10 cm, or from about 0.5 to about 5 cm.

As used herein in relation to microchannel reactors, the term "contact time" refers to the volume of the reaction zone within the microchannel reactor divided by the volumetric feed flow rate of the reactant composition at a temperature of 0° C. and a pressure of one atmosphere.

Preferably, the microchannel reactor used for the FTS process is capable of high heat flux for cooling of the process microchannels during the reaction, which may be achieved by incorporating heat exchange channels as described above. The microchannel reactor for FTS may be designed to achieve a heat flux greater than 1 W/cm². The heat flux for convective heat exchange in the microchannel reactor may range from about 1 to about 25 watts per square centimeter of surface area of the process microchannels (W/cm²) in the microchannel reactor, suitably from about 1 to about 10 W/cm². The heat flux for phase change or simultaneous endothermic reaction heat exchange may range from about 1 to about 250 W/cm², from about 1 to about 100 W/cm², from about 1 to about 50 W/cm², from about 1 to about 25 W/cm², and from about 1 to about 10 W/cm².

The cooling of the process microchannels during the reaction is advantageous for controlling selectivity towards the main or desired product due to the fact that such added cooling reduces or eliminates the formation of undesired by-products from undesired parallel reactions with higher activation energies. As a result of this cooling, the temperature of the reactant composition at the entrance to the process microchannels may be within about 200° C., within about 150° C., within about 100° C., within about 50° C., within about 25° C., within about 10° C., of the temperature of the product (or mixture of product and unreacted reactants) at the exit of the process microchannels.

It will be recognised that features related to one aspect of the invention are also, where applicable, features of other aspects of the invention. It will further be recognised that features specified herein in one embodiment of the invention may be combined with other features specified herein to provide further embodiments.

DETAILED DESCRIPTION

The present invention is now described, by way of illustration only, with reference to the accompanying drawings, in which:

FIG. 1 shows the comparative FTS performance of a catalyst comprising a modified catalyst support prepared using an aqueous method (support B, shown by the squares) and one prepared using an alkoxide method (comparative support A, shown by crosses), showing the % CO conversion against the time on stream in days.

FIG. 2 shows the TGA/DSC profiles for a comparative modified catalyst support C. The TGA/DCS profile for comparative modified catalyst support C (1105-13-016-1) which exhibits a single isotherm at 265° C. indicating a one-step decomposition is shown by dashed lines. The solid lines shows the profile when the modified catalyst support C (1106-15-016-1) was subjected to prolonged calcinations (at 250° C.).

FIG. 10 (*a*) shows the MS profiles for the unique mass fragments for $CO/CO_2$ taken in conjunction with the TGA/DSC profile of FIG. 8 for a support dried at 100° C.; (b) shows the MS profiles for the unique mass fragments for $CO/CO_2$ taken in conjunction with the TGA/DSC profile of FIG. 8 for a support calcined at 250° C.

Figure 1:
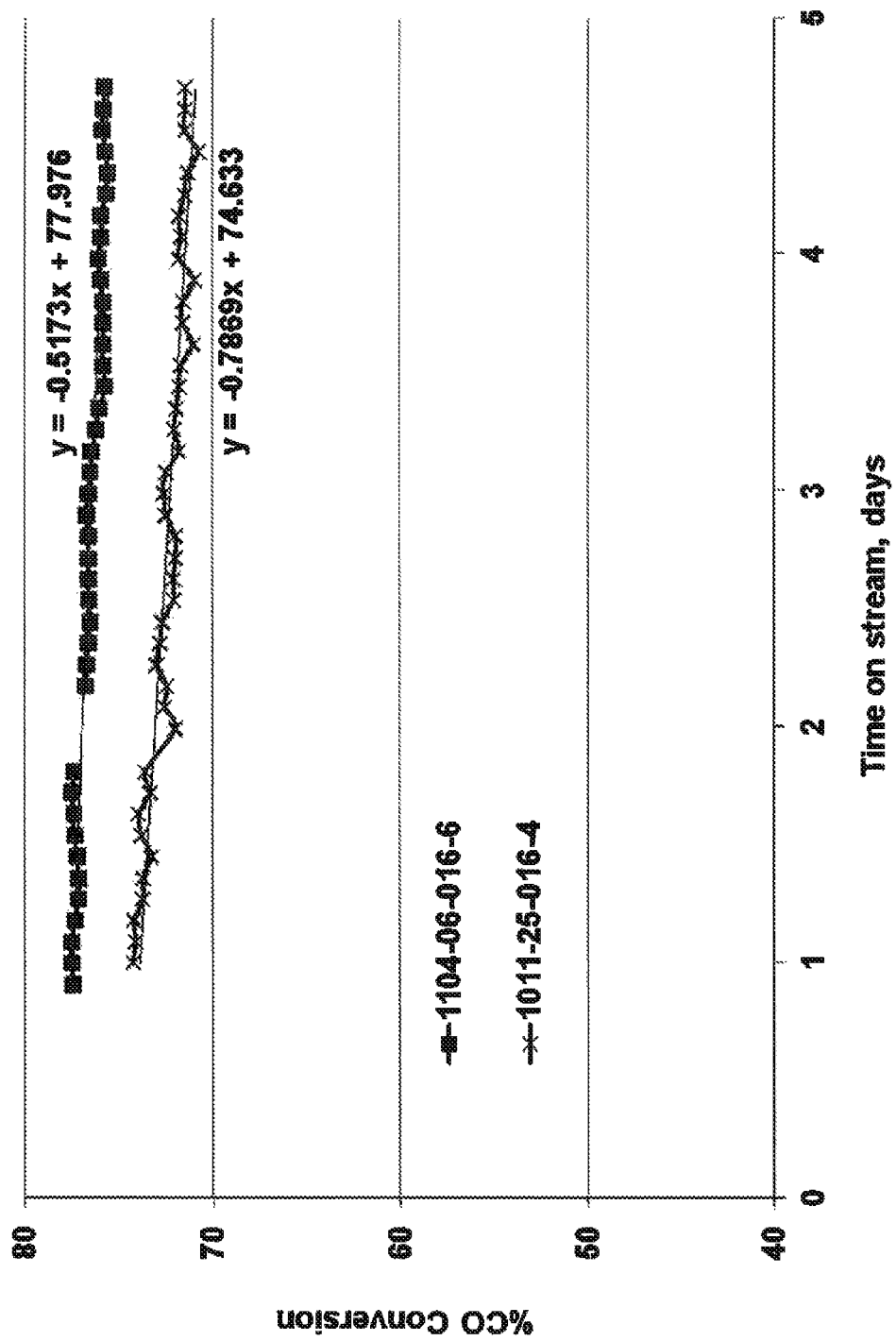

The invention is further illustrated by the following examples. It will be appreciated that the examples are for illustrative purposes only and are not intended to limit the invention as described above. Modification of detail may be made without departing from the scope of the invention.

EXAMPLES

Example 1

(OCN11-027)

A comparison between a catalyst comprising a titania-modified silica support manufactured using an alkoxide method and a catalyst comprising a titania-modified silica support manufactured using the aqueous method of the present invention was carried out.

Synthesis of Modified Catalyst Support Using Alkoxide Method (Comparative Support A)

Silica bare catalyst support material (Grace Davison, SG432 180 to 300 µm particle size) was dried at 100° C. for 2 hours and allowed to cool to room temperature before impregnation. The impregnation solution was made by mixing 58.7 g of titanium isopropoxide with 60 ml of isopropanol, giving a solution volume of approximately 120 ml. 84 g of silica (weight determined after drying) was impregnated by spraying with the impregnation solution. Following impregnation, the modified catalyst support was dried at a temperature that increased at a ramp rate of 2° C./min up to 100° C. The temperature was held at 100° C. for 10 hours.

The resulting catalyst support A had $TiO_2$ present as titanium alkoxide bound to silica surface. The amount is equivalent to 16% $TiO_2$ on silica support. (Conversion to titania occurs during subsequent calcination.)

Synthesis of Modified Catalyst Support Using Aqueous Method of Present Invention (Support B)

Silica bare catalyst support material (Grace Davison SG432/LC150, 180 to 300 µm sieve particle size range) was dried at 100° C. for 2 hours and allowed to cool to room temperature before impregnation. The impregnation solution was made by dissolving 25 g of citric acid in minimum water at 40 to 45° C. and cooling down to less than 30° C. The citric acid solution was then added to 118 g (97 ml) of titanium (IV) bis(ammonium lactate)dihydroxide solution (TALH) and made up to the required volume of impregnation, which was about 130 to 135 ml, with water. 84 g of silica (weight determined after drying) was impregnated by spraying with the impregnation solution. Following impregnation, the modified catalyst support was dried at a temperature that increased at a ramp rate of 2° C./min up to 100° C. The temperature was held at 100° C. for 5 hours. The modified support catalyst was subsequently calcined by increasing the temperature to 250° C. using a ramp rate of 2° C./min and holding the temperature at 250° C. for 5 hours. The yield of the modified catalyst support B after drying and calcining was about 120 g. The modified catalyst support B was dark brown in colour.

The resulting catalyst support B was a 16% $TiO_2$ on silica support, incompletely calcined from the titanium alkoxide complex. Calcination is completed occurs during the calcination after cobalt nitrate impregnation.

support A obtained from the second impregnation step (34.40 g). The modified catalyst support was then dried at a temperature that increased at a ramp rate of 2° C./min up to 100° C. The temperature was held at 100° C. for 5 hours. The modified support catalyst was subsequently calcined by increasing the temperature to 250° C. using a ramp rate of 2° C./min and holding the temperature at 250° C. for 3 hours.

A fourth impregnation step was carried out by using 22.2 ml of the solution to impregnate the modified catalyst support A obtained from the third impregnation step (41.60 g). The modified catalyst support was then dried at a temperature that increased at a ramp rate of 2° C./min up to 100° C. The temperature was held at 100° C. for 5 hours. The modified support catalyst was subsequently calcined by increasing the temperature to 250° C. using a ramp rate of 2° C./min and holding the temperature at 250° C. for 3 hours.

The four impregnation steps are summarised in Table 1.

TABLE 1

| Step | Support wt (g) | $Co(NO_3)_2 6H_2O$ (g) (Purity 98%) | $Co(NO_3)_2 6H_2O$ (g) | $Co_3O_4$ (g) | Co (g) | Citic acid (g) | Perrhenic acid (g) | % Re (g) | $H_2O$ (ml) | Solution volume (ml) | Mass (g) | % Co |
|---|---|---|---|---|---|---|---|---|---|---|---|---|
| 1 | 20 | 26.53 | 26 | 7.17 | 5.26 | 3.75 | 0.0480 | 0.05 | min. | 20.9 | 27.2 | 19.4 |
| 2 | 27.2 | 26.53 | 26 | 7.17 | 5.26 | 3.75 | 0.0480 | 0.05 | min. | 20.7 | 34.4 | 30.6 |
| 3 | 34.4 | 26.53 | 26 | 7.17 | 5.26 | 3.75 | 0.0480 | 0.05 | min. | 21.2 | 41.6 | 38.0 |
| 4 | 41.6 | 26.53 | 26 | 7.17 | 5.26 | 3.75 | 0.0480 | 0.05 | min. | 22.2 | 48. | 43.2 |
| Total | | 106.12 | | | | 15.01 | 0.19 | 0.20 | | 85.01 | | |

Synthesis of Catalysts

Catalyst A 15 g of citric acid monohydrate (Sigma Aldrich, ACS Reagent) was dissolved in water. To the clear solution was added 106 g of cobalt nitrate hexahydrate (Sigma Aldrich, 98% purity) and then the solution was heated to 40 to 45° C. until the salt dissolved. The minimum required water was used to obtain a clear solution. 0.19 g of perrhenic acid (Sigma Aldrich, 70 wt % solution in water, 99.99% purity) was added to the cobalt nitrate and citric acid solution and was mixed well. The resulting solution was cooled to room temperature (less than 30° C.) and made up with water to 85 to 88 ml.

A first impregnation of catalyst support A was carried out by using 20.9 ml of the solution to impregnate 20 g of the modified catalyst support A. The modified catalyst support A was then dried at a temperature that increased at a ramp rate of 2° C./min up to 100° C. The temperature was held at 100° C. for 5 hours. The modified support catalyst was subsequently calcined by increasing the temperature to 250° C. using a ramp rate of 2° C./min and holding the temperature at 250° C. for 3 hours.

A second impregnation step was carried out by using 20.7 ml of the solution to impregnate the modified catalyst support A obtained from the first impregnation step (27.20 g). The modified catalyst support was then dried at a temperature that increased at a ramp rate of 2° C./min up to 100° C. The temperature was held at 100° C. for 5 hours. The modified support catalyst was subsequently calcined by increasing the temperature to 250° C. using a ramp rate of 2° C./min and holding the temperature at 250° C. for 3 hours.

A third impregnation step was carried out by using 21.2 ml of the solution to impregnate the modified catalyst A promoter addition step was then carried out using 20 g of the catalyst precursor obtained after the four impregnation steps. 0.06 g of tetraammine platinum hydroxide (Alfa Aesar, 9.3% Pt w/w) was added to 9 ml water to make a dilute solution and this solution was used to further impregnate the catalyst precursor. After impregnation, the catalyst was then dried at a temperature that increased at a ramp rate of 2° C./min up to 100° C. The temperature was held at 100° C. for 5 hours. The catalyst was subsequently calcined by increasing the temperature to 250° C. using a ramp rate of 2° C./min and holding the temperature at 250° C. for 3 hours.

The resulting catalyst A had 0.03% Pt and is suitable for use as, for example, a Fischer-Tropsch catalyst.

Catalyst B g of cobalt nitrate hexahydrate (Sigma Aldrich, 98% purity) was dissolved in water and then the solution was heated to 40 to 45° C. until the salt dissolved completely. The minimum required water was used to obtain a clear solution. 0.048 g of perrhenic acid (Sigma Aldrich, 70 wt % solution in water, 99.99% purity) was added to the cobalt nitrate solution and mixed well. The resulting solution was cooled to room temperature (less than 30° C.) and made up with water to 19 ml.

A first impregnation of catalyst support B was carried out by using 19 ml of the cobalt nitrate/perrhenic acid solution to impregnate 20 g of the modified catalyst support B. The resulting modified catalyst support B was then dried at a temperature that increased at a ramp rate of 2° C./min up to 100° C. The temperature was held at 100° C. for 5 hours. The modified support catalyst was subsequently calcined by increasing the temperature to 200° C. using a ramp rate of 2° C./min and holding the temperature at 200° C. for 3 hours, followed by further increasing the temperature to 250° C. using a ramp rate of 2° C./min and holding the temperature at 250° C. for 1 hour.

12 g of citric acid monohydrate (Sigma Aldrich, ACS Reagent) was dissolved in water. To the clear solution was added 81.4 g of cobalt nitrate hexahydrate (Sigma Aldrich, 98% purity) and then the solution was heated to 40 to 45° C. until the salt dissolved. The minimum required water was used to obtain a clear solution. 0.14 g of perrhenic acid (Sigma Aldrich, 70 wt % solution in water, 99.99% purity) was added to the cobalt nitrate and citric acid solution and was mixed well. The resulting stock solution was cooled to room temperature (less than 30° C.) and made up with water to 66 to 67 ml.

A second impregnation step was carried out by using about 22 ml of the stock solution to impregnate the modified catalyst support B obtained from the first impregnation step (27.20 g). The modified catalyst support was then dried at a temperature that increased at a ramp rate of 2° C./min up to 100° C. The temperature was held at 100° C. for 5 hours. The modified support catalyst was subsequently calcined by increasing the temperature to 250° C. using a ramp rate of 2° C./min and holding the temperature at 250° C. for 3 hours.

A third impregnation step was carried out by using about 22 ml of the stock solution to impregnate the modified catalyst support B obtained from the second impregnation step (34.40 g). The modified catalyst support was then dried at a temperature that increased at a ramp rate of 2° C./min up to 100° C. The temperature was held at 100° C. for 5 hours. The modified support catalyst was subsequently calcined by increasing the temperature to 250° C. using a ramp rate of 2° C./min and holding the temperature at 250° C. for 3 hours.

A fourth impregnation step was carried out by using about 22 ml of the stock solution to impregnate the modified catalyst support B obtained from the third impregnation step (41.60 g). The modified catalyst support was then dried at a temperature that increased at a ramp rate of 2° C./min up to 100° C. The temperature was held at 100° C. for 5 hours. The modified support catalyst was subsequently calcined by increasing the temperature 20 to 250° C. using a ramp rate of 2° C./min and holding the temperature at 250° C. for 3 hours.

The four impregnation steps are summarised in Table 2. The total value in Table 2 relates to the total of steps 2 to 4 only.

of 2° C./min up to 100° C. The temperature was held at 100° C. for 5 hours. The catalyst was subsequently calcined by increasing the temperature to 250° C. using a ramp rate of 2° C./min and holding the temperature at 250° C. for 3 hours.

The resulting catalyst had 0.03% Pt and is suitable for use as, for example, a Fischer-Tropsch catalyst.

Comparison

The catalysts comprising modified catalyst supports A and B were then screened and the % CO conversion was measured over a number of days on stream. FIG. 1 shows that the performance of the catalyst comprising modified catalyst support B (i.e. the support according to the present invention) provides a higher % CO conversion compared to the catalyst comprising comparative modified catalyst support A. In other words, the catalyst comprising the support of the present invention remained more active over the screening period.

Furthermore, a linear fit of the data in FIG. 1 showed that the deactivation rate of modified catalyst support B was lower than comparative modified catalyst support A. This indicates that modified catalyst support B was more stable than comparative modified catalyst support A.

Example 2

The Effect of the Carboxylic Acid on Supports (OCIN11-032)

A comparison between a modified catalyst support which was modified using an aqueous solution comprising a carboxylic acid (i.e. the method of the present invention, support D) and one which was modified using an aqueous solution which did not comprise a carboxylic acid was carried out as follows (i.e. a comparative method, support C).

Synthesis of Modified Catalyst Support Using Comparative Aqueous Method (Support C)

Silica bare catalyst support material (Grace Davison SG432/LC150, 180 to 300 μm) was dried at 100° C. for 2 hours and allowed to cool to room temperature before impregnation. The impregnation solution was made by adding water to 118 g (97 ml) of titanium (IV) bis(ammonium lactate)dihydroxide solution (TALH) to make the required volume for impregnation, which was about 130 to 135 ml. 84 g of silica was impregnated by spraying with the impregnation solution. Following impregnation, the modified catalyst support was dried at a temperature that increased at a ramp rate of 2° C./min up to 100° C. The temperature was held at 100° C. for 5 hours. The modified support catalyst was subsequently calcined by increasing the temperature to 250° C. using a ramp rate of 2° C./min and holding the temperature at 250° C. for 5 hours. The yield of the modified

TABLE 2

| Step | Support wt (g) | $Co(NO_3)_2 6H_2O$ (g) (Purity 98%) | $Co(NO_3)_2 6H_2O$ (g) | $Co_3O_4$ (g) | Co (g) | Citic acid (g) | Perrhenic acid (g) | % Re (g) | $H_2O$ (ml) | Solution volume (ml) | Mass (g) | % Co |
|---|---|---|---|---|---|---|---|---|---|---|---|---|
| 1 | 20 | 24.49 | 24 | 6.62 | 4.86 | 0.00 | 0.0480 | 0.05 | min. | 19 | 26.6 | 18.2 |
| 2 | 27.2 | 27.14 | 26.6 | 7.33 | 5.38 | 3.84 | 0.0480 | 0.05 | min. | 22 | 34.5 | 29.7 |
| 3 | 34.4 | 27.14 | 26.6 | 7.33 | 5.38 | 3.84 | 0.0480 | 0.05 | min. | 22 | 41.7 | 37.4 |
| 4 | 41.6 | 27.14 | 26.6 | 7.33 | 5.38 | 3.84 | 0.0480 | 0.05 | min. | 22 | 48.9 | 42.9 |
| Total 2-4 | | 81.43 | | | | 11.52 | 0.14 | 0.20 | | 66.38 | | |

A promoter addition step was then carried out using 20 g of the catalyst precursor obtained after the four impregnation steps. 0.06 g of tetraammine platinum hydroxide (Alfa Aesar, 9.3% Pt w/w) was added to 9 ml water to make a dilute solution and this solution was used to further impregnate the catalyst precursor. After impregnation, the catalyst was then dried at a temperature that increased at a ramp rate catalyst support C after drying and calcining was about 120 g. The modified catalyst support C was dark brown in colour.

The resulting modified catalyst support C was a 16% $TiO_2$ on silica support.

Synthesis of Modified Catalyst Support Using Aqueous Method of Invention (Support D)

Silica bare catalyst support material (Grace Davison SG432/LC150, 180 to 300 μm) was dried at 100° C. for 2 hours and allowed to cool to room temperature before impregnation. The impregnation solution was made by dissolving 25 g of citric acid in minimum water at 40 to 45° C. and cooling down to less than 30° C. The citric acid solution was then added to 118 g (97 ml) of titanium (IV) bis (ammonium lactate)dihydroxide solution (TALH) and made up to the required volume of impregnation, which was about 130 to 135 ml, with water. 84 g of silica was impregnated by spraying with the impregnation solution. Following impregnation, the modified catalyst support was dried at a temperature that increased at a ramp rate of 2° C./min up to 100° C. The temperature was held at 100° C. for 5 hours. The modified support catalyst was subsequently calcined by increasing the temperature to 250° C. using a ramp rate of 2° C./min and holding the temperature at 250° C. for 5 hours. The yield of the modified catalyst support D after drying and calcining was about 120 g. The modified catalyst support D was dark brown in colour.

The resulting modified catalyst support D was a 16% $TiO_2$ on silica support.

Comparison

Comparative modified catalyst support C was compared to modified catalyst support D of the present invention. TGA/DSC (Thermogravimetry/Differential scanning calorimetry) was carried out on modified catalyst supports C and D. Simultaneous differential scanning colorimetry and thermogravimetric analysis of the support and catalyst precursors were carried out in a flow of air using TA thermal analyser. The sample loading was typically 20 to 30 mg. The sample was heated up to 600° C. at a ramp rate of 1° C./min.

Figure 2:
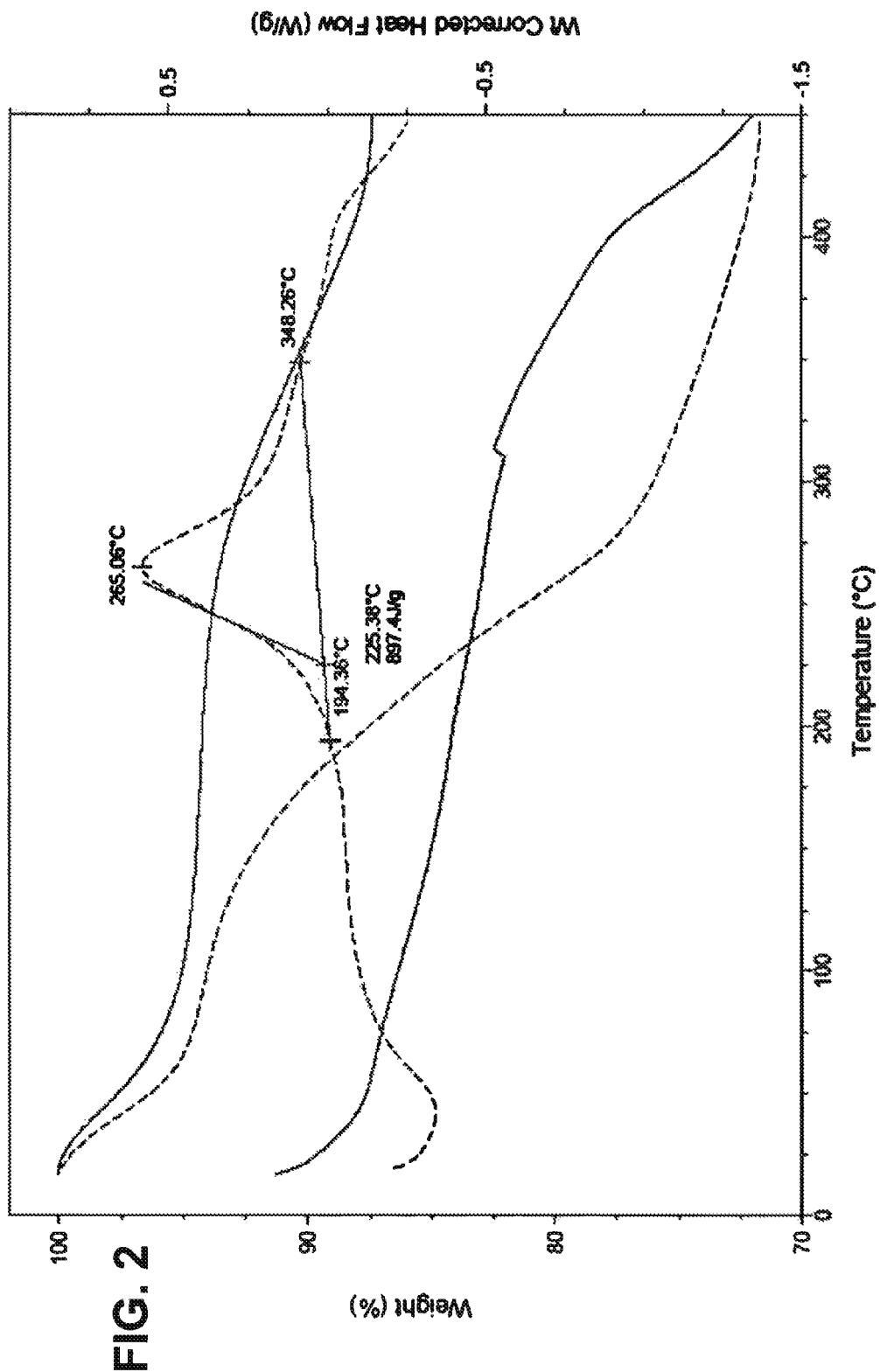

FIG. 2 shows the TGA/DCS profile for comparative modified catalyst support C (1105-13-016-1) which exhibits a single isotherm at 265° C. indicating a one-step decomposition. Modified catalyst support C was then subjected to prolonged calcinations (at 250° C.) but no further exotherm was observed under TGA/DCS analysis (1106-15-016-1). After prolonged calcinations at 250° C., the sample retained some amorphous carbon/coke (CHN analysis data shows 4.0% C and 0.5% N for the sample after calcination at 250° C.) that decomposes at a higher temperature and no exotherm was observed for this step.

Figure 3:
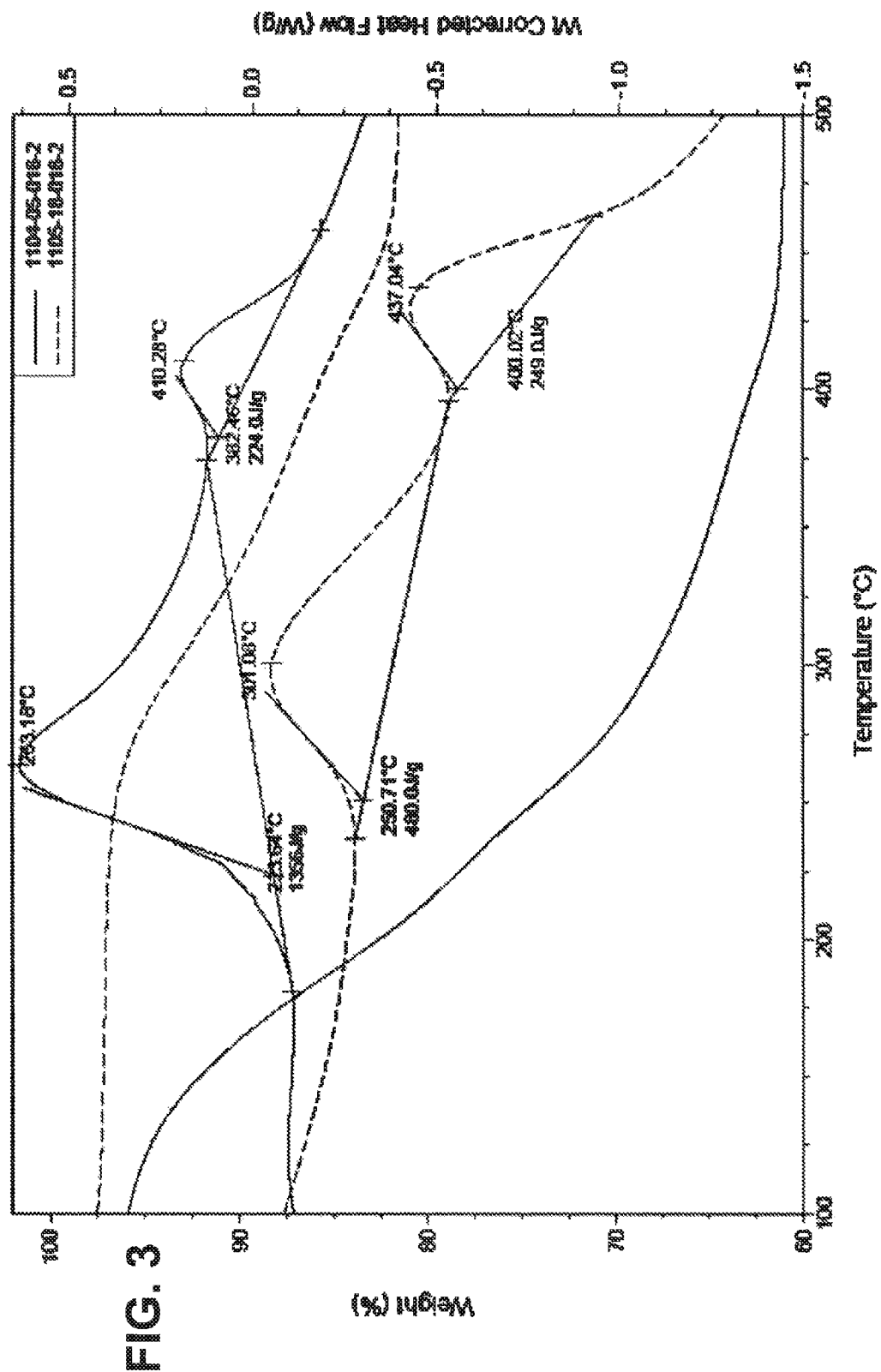
FIG. 3 shows the TGA/DSC profiles for a modified catalyst support D of the present invention (1104-05-016-2 and 1105-18-016-2).

In contrast, FIG. 3 shows the TGS/DCS profile for modified catalyst support D (1104-05-016-2) of the present invention which exhibits two separate isotherms indicating a two-step decomposition. The high temperature decomposition in FIG. 3 (1105-18-016-2) corresponds to decomposition after prolonged calcinations (at 250° C.). This shows that the presence of citric acid is stabilising the titanium species leading to a high temperature decomposition step which is not present in comparative modified catalyst support C.

Figure 4:
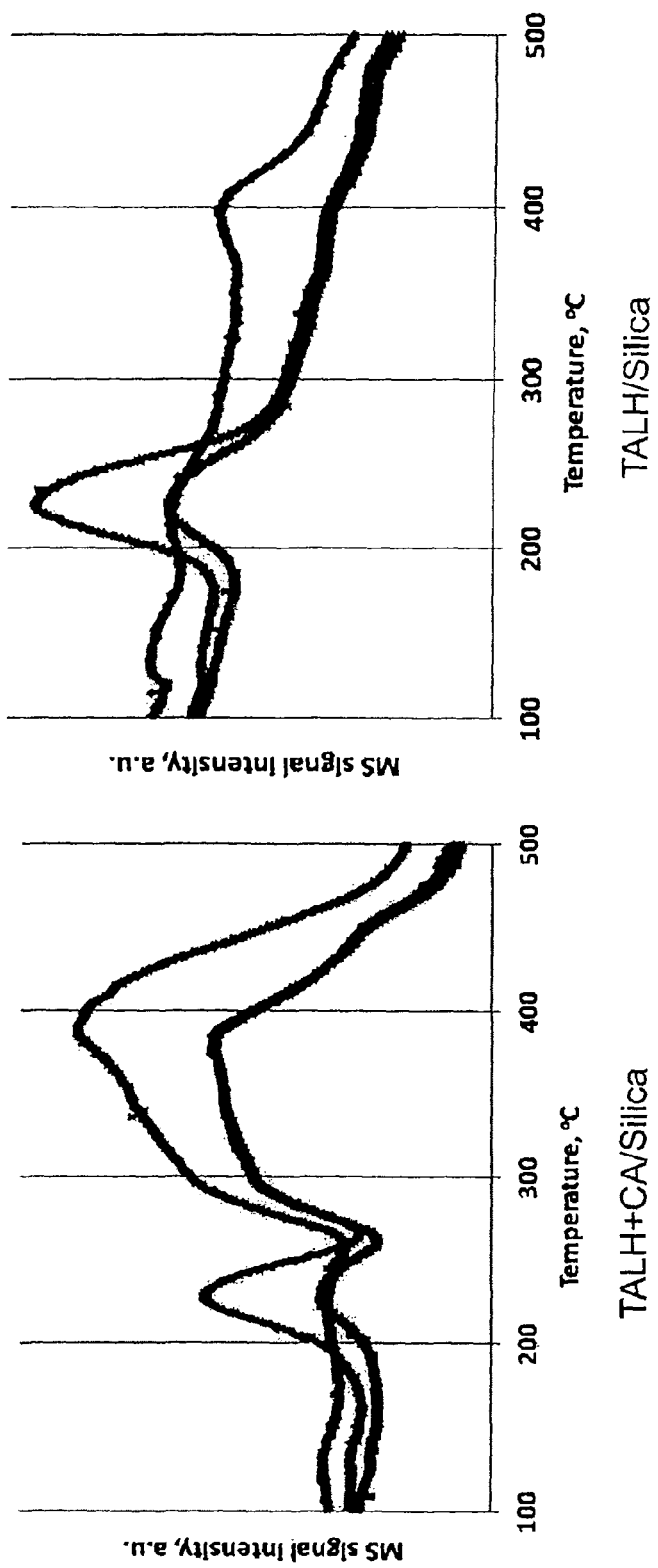
FIG. 4 shows the MS profiles for the unique mass fragments for $NO_x$ taken in conjunction with the TGA/DSC profiles of FIGS. 2 and 3.
Figure 5:
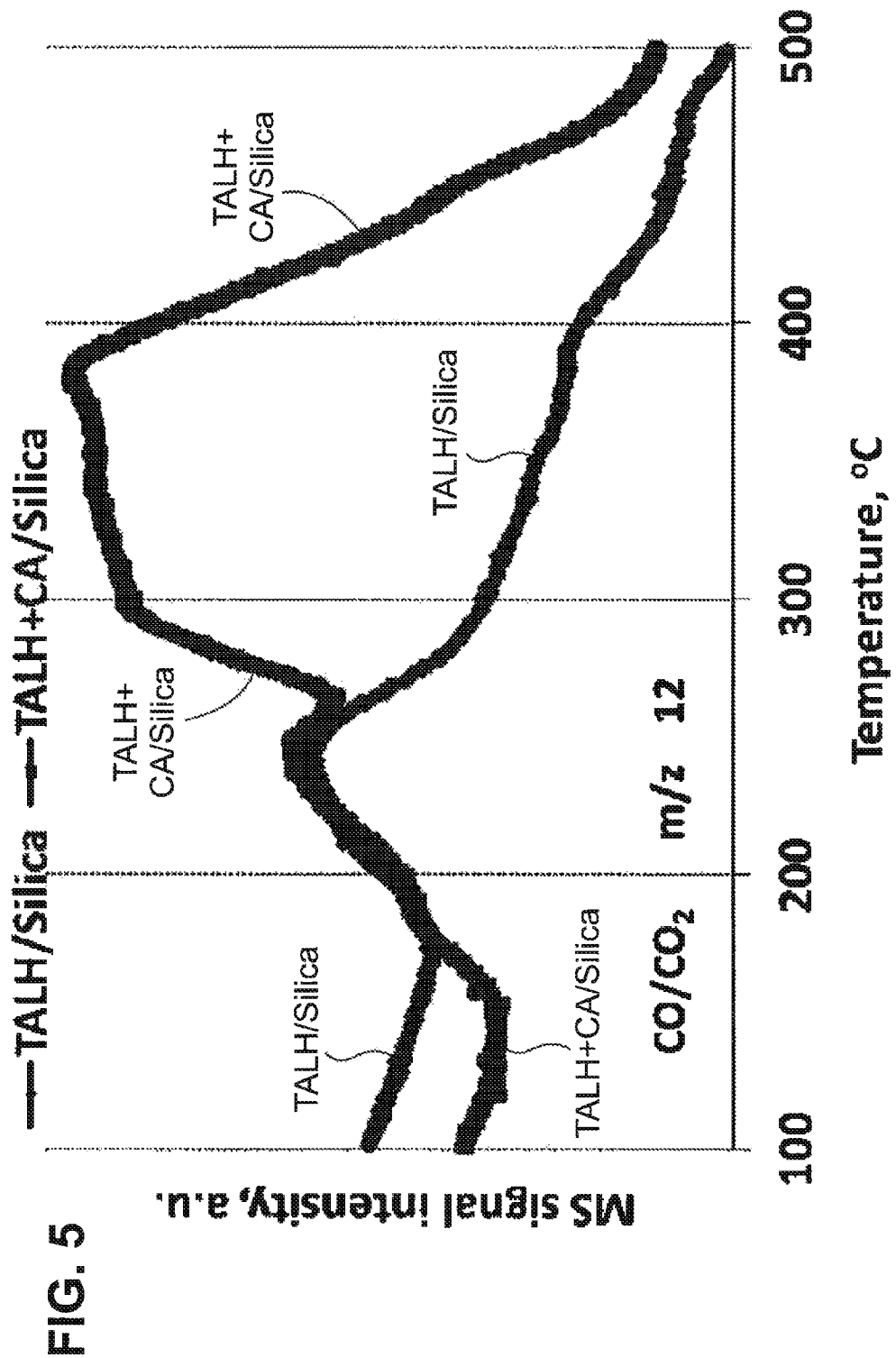
FIG. 5 shows the MS profiles for the unique mass fragments for $CO/CO_2$ taken in conjunction with the TGA/DSC profiles of FIGS. 2 and 3.

The evolved gases during thermal decomposition were analysed using Micromeritics 2920 AutochemII equipment with an on line mass spectrometer (MS). Temperature programmed oxidation (TPO) experiments were carried out using 5% $O_2$ in helium. About 100 to 150 mg of catalyst precursor sample was loaded in a U-shaped quartz microreactor and purged with helium for 2 minutes. Thermal decomposition of the support or catalyst precursor was done using 5% $O_2$/He at a programmed heating rate of 5° C./min up to 800° C. The gas flow rate was maintained at 50 ml/min. The evolved gases were monitored by analysing the outlet gases using an on line MS for all possible mass fragments. FIG. 4 and FIG. 5 show the unique mass fragments for NO and $CO/CO_2$ respectively. These data also show that the citric acid (CA) is stabilising the titanium species.

These results show that modified catalyst support D is more stable than comparative modified catalyst support C.

Figure 6:
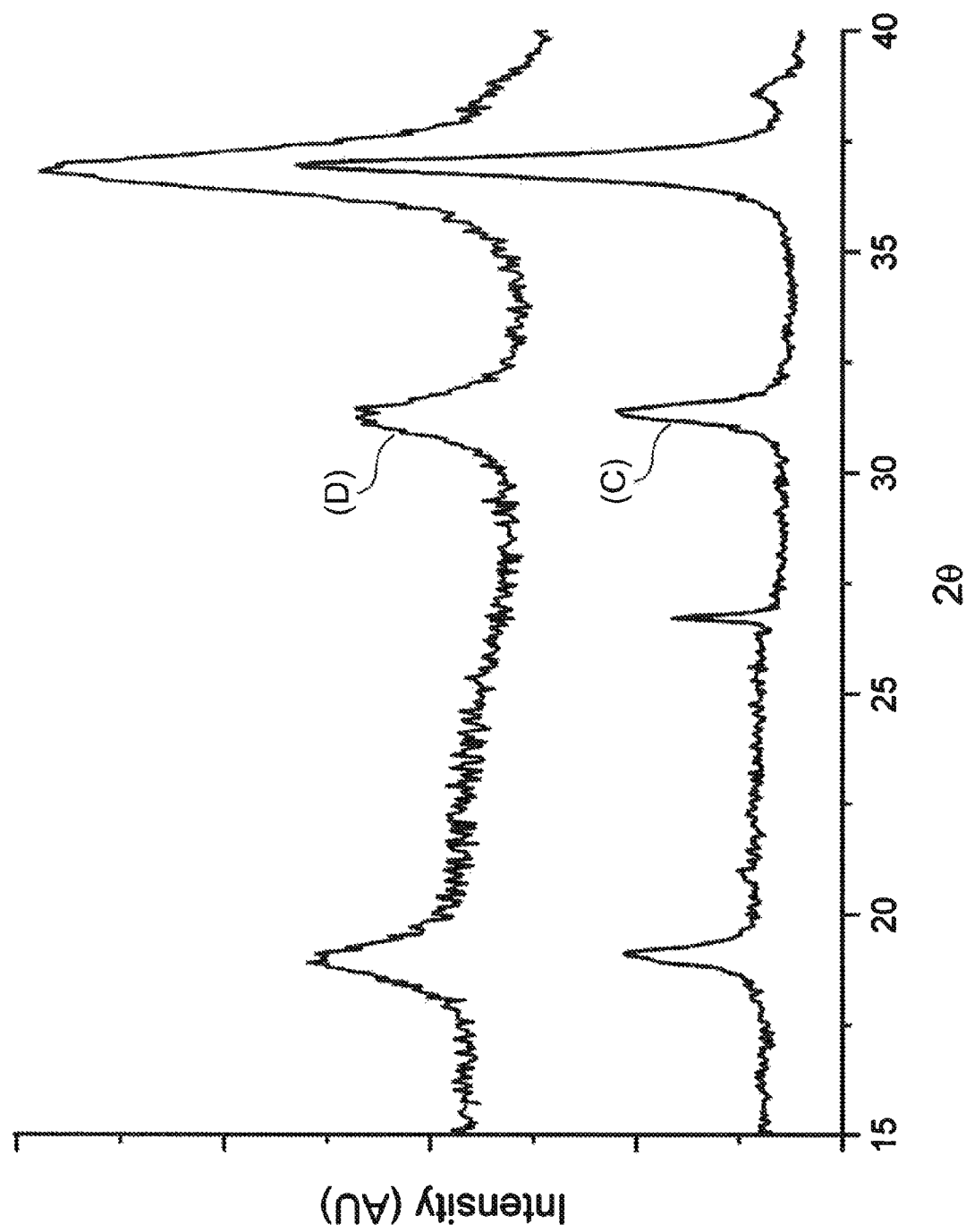
FIG. 6 shows the powder X-ray diffraction patterns for catalyst precursors prepared from modified catalyst supports C (lower pattern) and D (upper pattern).

X-ray diffraction data of catalyst precursors made from modified catalyst supports C and D (post-calcination, pre-activation) are shown in FIG. 6. The diffraction patterns of the catalyst precursors were collected at room temperature on a fully automated Siemens D5000 theta/theta powder diffractometer using Cu Kα radiation. Each sample was ground thoroughly before loading into a spinner carousel in air. Data were collected over the range 10-80° 2θ, with a step size of 0.05° and a step length of 12 s.

It is clear from these diffraction patterns that the crystal structure of the catalyst precursor made from modified support D is different from that made from modified support C. A sharp peak at 26.7° is present in the catalyst precursor made from support C. This peak may be modelled as the (110) rutile titania reflection. The sharpness of the peak at 26.7° indicates that this phase is not nanocrystalline. This data suggests that when citric acid is present with the aqueous titania precursor (support D) the titania phase is amorphous, but when the aqueous titania precursor is used without citric acid (support C) the titania phase is crystalline and not nanoparticulate.

Example 3

The Effect of the Carboxylic Acid on Deactivation Rate of Catalysts (OCIN11-032)

Fischer-Tropsch catalysts were prepared using modified catalyst supports C and D discussed in Example 2.

Catalyst C was made in the same way as catalyst A described in Example 1, except that modified catalyst support C was used in place of modified catalyst support A.

Catalyst D was made in the same way as catalyst B described in Example 1, except that modified catalyst support D was used in place of modified catalyst support B.

The catalysts C and D were each tested for Fischer-Tropsch synthesis performance. The catalyst (0.129 ml) diluted with SiC (2.184 ml) was loaded in a Spider reactor (L/D 31 cm) and reduced using pure hydrogen at 400° C. for 120 minutes at Gas Hourly Space Velocity (GHSV)=15 000 per hour. The temperature was increased from room temperature to 400° C. at 1° C./min. After the reduction, the reactor was cooled to 165° C. and the gas was switched from hydrogen to synthesis gas. The operating conditions were kept constant for 1 hour. The pressure was then increased to 20 bar at the flow rate of the reaction and held for 1 hour. The temperature was then increased from 165° C. to 190° C. at a ramp rate of 4° C./hour, from 190 to 210° C. (GHSV=12 400 per hour) at 2° C./hour and then kept at 210° C. (GHSV=12 400 per hour) for about 120 hours.

The liquid products from the reaction were trapped in hot and cold knock-out pots and the gas products were injected on line to a Clarus 600 gas chromatograph. Hydrogen, carbon monoxide and nitrogen were detected with a thermal conductivity detector and hydrocarbons (from $C_1$ to $C_4$) with a flame ionization detector. Conversion and product selectivity were calculated by using nitrogen as a tracer and employing a carbon mass balance.

Figure 7:
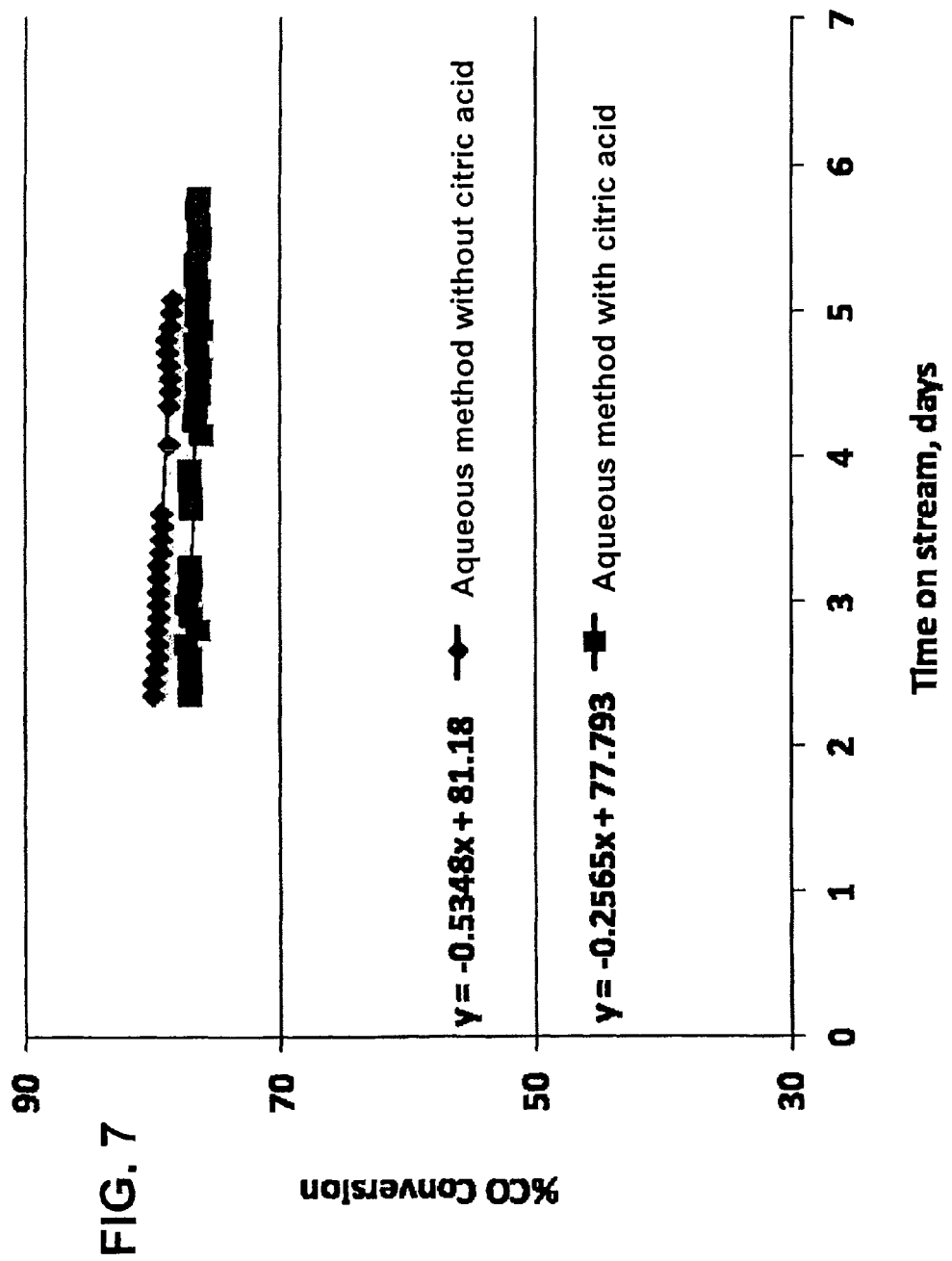
FIG. 7 shows the comparative FTS performance of catalysts comprising a modified catalyst support prepared using an aqueous method comprising citric acid (plotted with squares, 1106-14-016-2) and one prepared using an aqueous method without citric acid (plotted as diamonds, 1106-21-016-4), showing % CO conversion against time on stream in days.

The results are shown in FIG. 7. Linear fits to the data in FIG. 7 show that the catalyst (1106-14-016-2) prepared using a modified catalyst support in which citric acid had been present during the titania modification step (i.e. modified catalyst support D) displayed a lower deactivation rate compared to one (1106-21-016-4) prepared without citric acid (i.e. comparative modified catalyst support C).

Example 4

The Effect of Calcination on Stability of Catalysts (OCIN11-035)

A comparison between a catalyst precursor comprising a modified catalyst support that has not been calcined (support E), a modified catalyst that has been calcined at 250° C. (support F), and a modified catalyst support that has been calcined at 350° C. (support G) was carried out as follows.
Synthesis of Modified Catalyst Support E.

Silica bare catalyst support material (Grace Davison SG432/LC150, 180 to 300 μm) was dried at 100° C. for 2 hours and allowed to cool to room temperature before impregnation. The impregnation solution was made by adding water to 118 g (97 ml) of titanium (IV) bis(ammonium lactate)dihydroxide solution (TALH) to make it up to the required volume for impregnation, which was about 130 to 135 ml. 84 g of silica was impregnated by spraying with the impregnation solution. Following impregnation, the modified catalyst support was dried at a temperature that increased at a ramp rate of 2° C./min up to 100° C. The temperature was held at 100° C. for 10 hours. The resulting modified catalyst support E was a 16% $TiO_2$ on silica support.
Synthesis of Modified Catalyst Support F.

Silica bare catalyst support material (Grace Davison SG432/LC150, 180 to 300 μm) was dried at 100° C. for 2 hours and allowed to cool to room temperature before impregnation. The impregnation solution was made by adding water to 118 g (97 ml) of titanium (IV) bis(ammonium lactate)dihydroxide solution (TALH) to make it up to the required volume for impregnation, which was about 130 to 135 ml. 84 g of silica was impregnated by spraying with the impregnation solution. Following impregnation, the modified catalyst support was dried at a temperature that increased at a ramp rate of 2° C./min up to 100° C. The temperature was held at 100° C. for 5 hours. The modified support catalyst was subsequently calcined by increasing the temperature to 250° C. using a ramp rate of 2° C./min and holding the temperature at 250° C. for 5 hours. The yield of the modified catalyst support F after drying and calcining was about 120 g. The modified catalyst support F was dark brown in colour.

The resulting catalyst support F was a 16% $TiO_2$ on silica support.
Synthesis of Modified Catalyst Support G.

Silica bare catalyst support material (Grace Davison SG432/LC150, 180 to 300 μm) was dried at 100° C. for 2 hours and allowed to cool to room temperature before impregnation. The impregnation solution was made by adding water to 118 g (97 ml) of titanium (IV) bis(ammonium lactate)dihydroxide solution (TALH) to make it up to the required volume for impregnation, which was about 130 to 135 ml. 84 g of silica was impregnated by spraying with the impregnation solution. Following impregnation, the modified catalyst support was dried at a temperature that increased at a ramp rate of 2° C./min up to 100° C. The temperature was held at 100° C. for 5 hours. The modified support catalyst was subsequently calcined by increasing the temperature to 250° C. using a ramp rate of 2° C./min and holding the temperature at 250° C. for 5 hours, followed by further increasing the temperature to 360° C. using a ramp rate of 2° C./min and holding the temperature at 360° C. for 5 hours. The resulting catalyst support G was a 16% $TiO_2$ on silica support.

Figure 8:
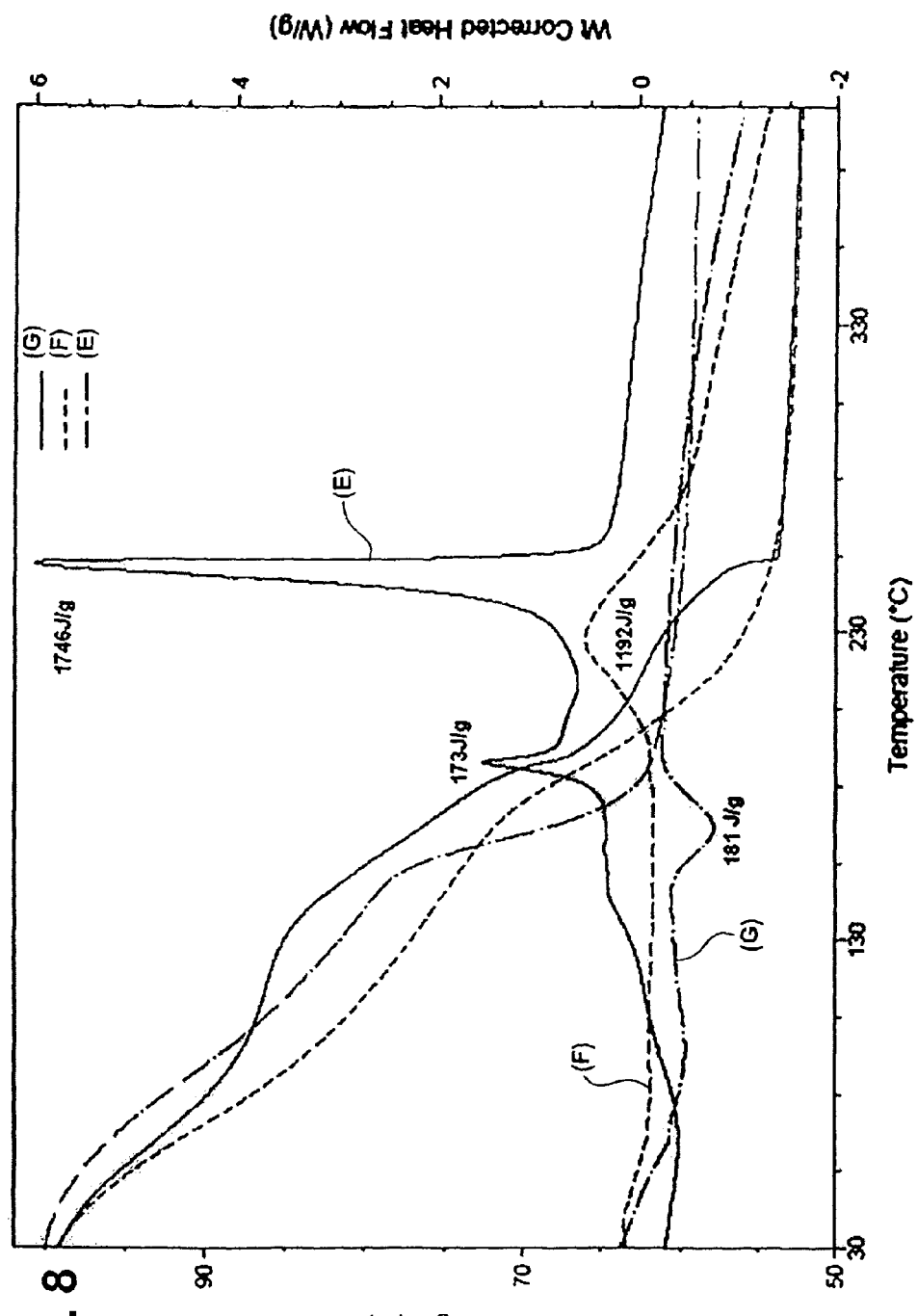
FIG. 8 shows the comparative TGA/DSC profiles for a catalyst precursor comprising a modified catalyst support prepared by calcining at 100° C. (solid lines), 250° C. (dashed lines) and 360° C. (long dash with dots lines).

These modified supports were used to form Fischer-Tropsch catalyst precursors E, F and G in the way as used to make the catalyst B in Example 1 using modified catalyst supports E, F and G, respectively, instead of modified catalyst support B. A promotion step (with platinum) was performed in all the catalyst preparations.
Results FIG. 8 shows the TGA/DSC profile (obtained in the same way as described in Example 2) of catalyst precursors E, F and G. The decomposition of catalyst precursor E of the present invention (following drying at 100° C.) occurred in two steps, both being exothermic. In contrast, the decomposition of comparative catalyst precursor F (following calcination at 250° C.) occurred in a single step within a broad temperature range. This shows that the presence of a calcining step at 250° C. stabilises the titanium species on the support.

Catalyst precursor G exhibited a single low temperature endothermic decomposition peak following complete decomposition of TALH at 360° C. This shows that the calcining temperature used in making the modified catalyst support G is high enough to convert TALH to $TiO_2$.

CHN analysis of catalyst precursors E, F and G was performed and the results are shown in Table 3.

TABLE 3

|  | Calcination temperature (° C.) | | |
| --- | --- | --- | --- |
|  | 100 | 250 | 360 |
| % C | 13.17 | 6.93 | 0.25 |
| % H | 1.69 | 0.24 | <0.1 |
| % N | 2.12 | 1.31 | <0.1 |

Figure 9A:
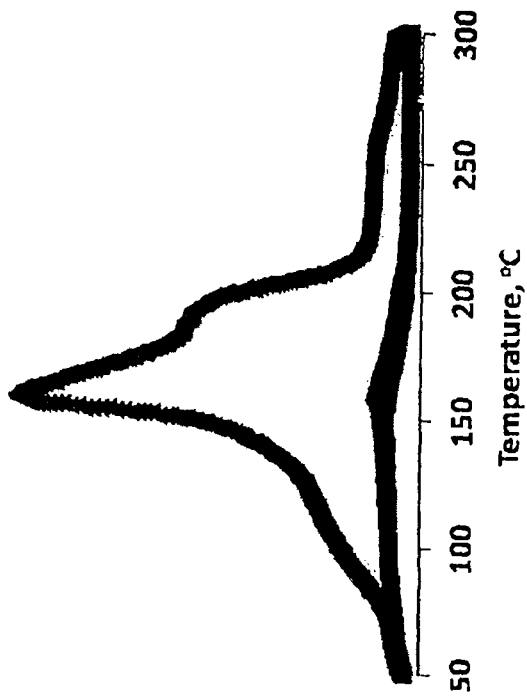
FIG. 9 (*a*) shows the MS profiles for the unique mass fragments for $NO_x$ taken in conjunction with the TGA/DSC profile of FIG. 8 for a support dried at 100° C.; (b) shows the MS profiles for the unique mass fragments for $NO_x$ taken in conjunction with the TGA/DSC profile of FIG. 8 for a support calcined at 250° C.
Figure 9B:
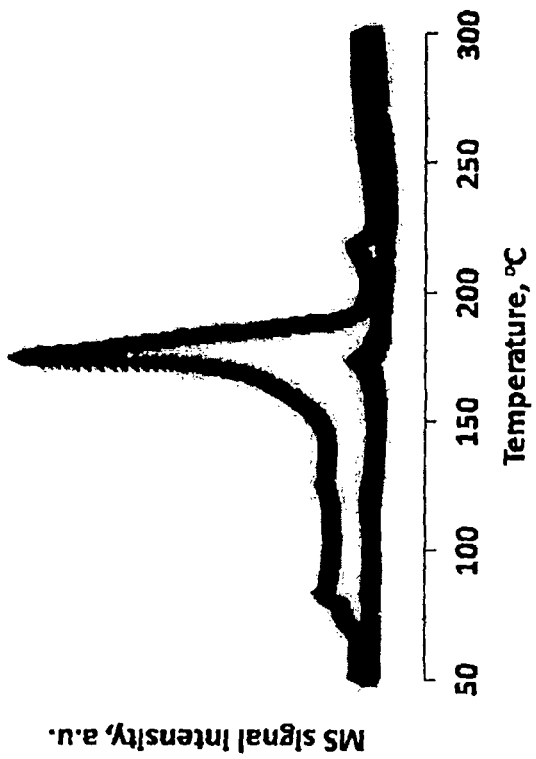

The evolved gases during thermal decomposition for catalyst precursor E and catalyst precursor F were analysed using Micromeritics AutochemII equipment with an on line MS, as described in Example 2. FIG. 9 and FIG. 10 show the unique mass fragments for $CO/CO_2$ and NO respectively. These data confirm that calcining at 250° C. compared to 360° C. stabilises the titanium species leading to more stable catalyst precursor materials. Both figures show E (support used is calcined at 100° C.) and F (support used is calcined at 250° C.). FIG. 9 shows the presence of NOx in the evolved exit gas mixture due to the decomposition of the cobalt nitrate in the precursor. FIG. 10 shows the presence of $CO/CO_2$ in the same exit gas and that is coming from the TALH.

These results show that catalyst precursor F of the present invention is more stable than comparative catalyst precursors E and G.

Example 5

Figure 11:
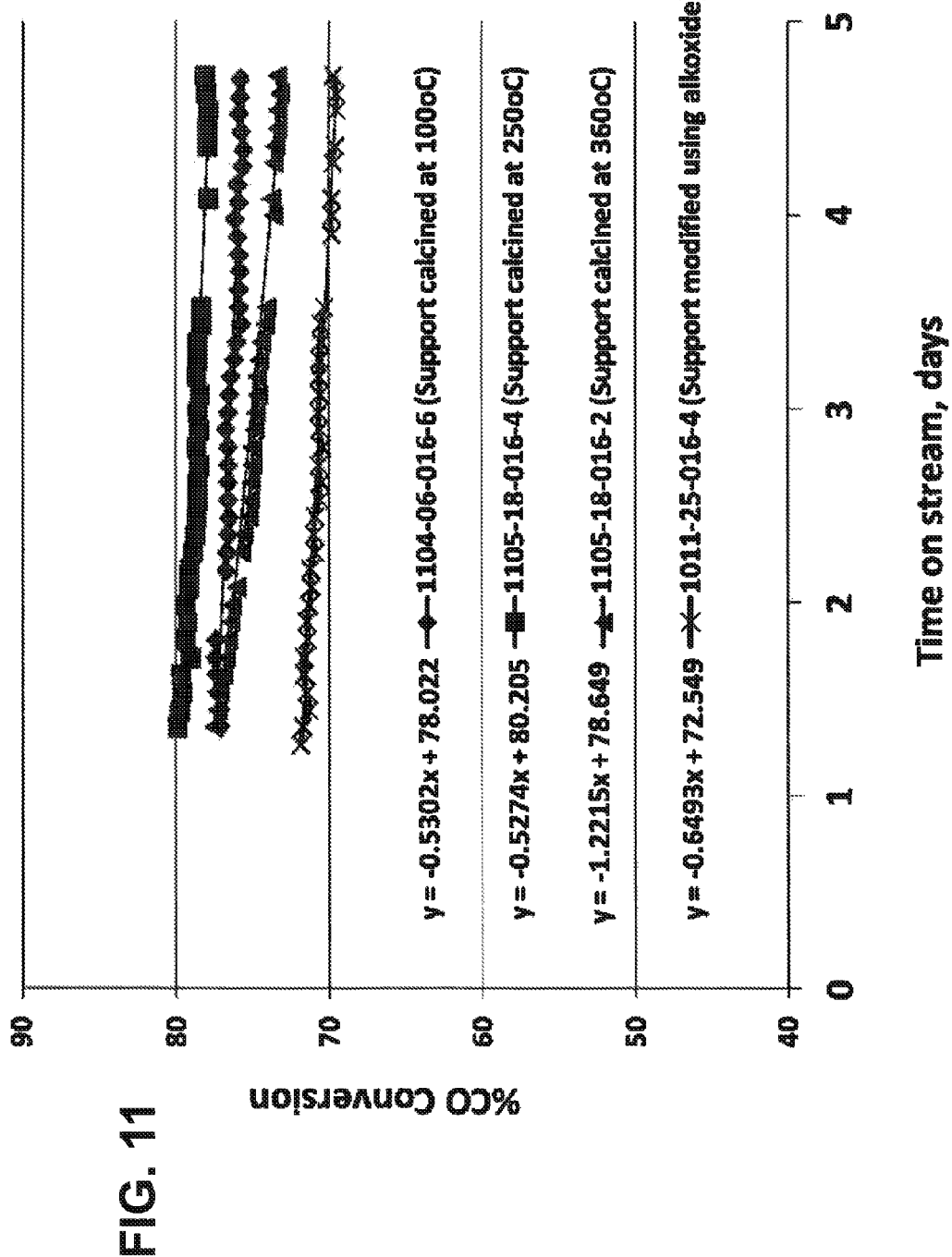
FIG. 11 shows the comparative FTS performance of a catalyst comprising a modified catalyst support prepared using an aqueous method but calcined at 100° C. (1104-06-016-6); calcined at 250° C. (1105-18-016-4); and calcined at 360° C. (1105-18-016-2); and one prepared using an alkoxide method (1011-25-016-4).

The active catalyst formed from catalyst precursors E, F and G described in Example 4 were tested for Fischer-Tropsch synthesis performance, as described in Example 3 and compared to an active catalyst comprising a modified catalyst support prepared using an alkoxide method. The results are shown in FIG. 11. FIG. 11 shows that the catalyst formed from catalyst precursor F provides a higher % CO conversion compared to the catalysts comprising a catalyst support calcined at 100° C. or at 360° C., or comprising a catalyst support modified using an alkoxide method. In other words, the catalyst of the present invention remained more active over the screening period.

Furthermore, a linear fit of the data in FIG. 11 showed that the deactivation rate of the catalyst formed from catalyst precursor F was lower than for the catalyst precursors E and G or for the comparative catalyst comprising a catalyst support modified using an alkoxide method.

This shows the effect of calcination temperature of the support after titanium-modification. The more carbon there is on the support, the more stable the catalyst will be. However, the nature of the carbonaceous species and the heat evolved during the decomposition of cobalt precursor are also important. After the modified support was calcined at 360° C., the catalyst is less stable.

The invention claimed is:

1. A method for the preparation of a modified catalyst support comprising:
   a. treating a bare catalyst support material with an acidic aqueous solution or dispersion to form the modified support, the acidic aqueous solution or dispersion comprising:
      one or more titanium metal sources; and
      one or more carboxylic acids;
   b. drying the modified support; and
   c. calcining the modified support,
   wherein at least a portion of the one or more carboxylic acids is partially decomposed on the modified catalyst support during at least one of the drying and the calcining of the modified support, and the modified support comprises from about 11% to about 30% by weight $TiO_2$.

2. The method of claim 1, wherein the method of treating is impregnating.

3. The method of claim 1, wherein the titanium metal source is titanium (IV) bis(ammoniumlactato)dihydroxide.

4. The method of claim 1, wherein the one or more carboxylic acids comprises citric acid.

5. The method of claim 1, wherein the one or more carboxylic acids comprises lactic acid.

6. The method of claim 1, wherein the bare catalyst support material is a refractory oxide.

7. The method of claim 6, wherein the refractory oxide is silica.

8. The method of claim 1, wherein the modified catalyst support is a modified Fischer-Tropsch catalyst support.

9. The method of claim 1 wherein the modified catalyst support is treated to form a catalyst precursor, the method further comprising:
   d. depositing a solution or suspension comprising at least one catalyst metal precursor and a complexing/reducing agent onto the modified catalyst support to form the catalyst precursor;
   e. optionally drying the catalyst precursor; and
   f. calcining the catalyst precursor.

10. The method of claim 9, wherein the catalyst metal precursor is a cobalt-containing precursor.

11. The method of claim 10, wherein the cobalt-containing precursor is cobalt nitrate.

12. The method of claim 9, wherein the complexing/reducing agent is one or more polar organic solvents.

13. The method of claim 12, wherein the polar organic solvent is one or more carboxylic acids.

14. The method of claim 13, wherein the carboxylic acid comprises citric acid.

15. The method of claim 9, wherein the calcination is carried out in an oxygen-containing atmosphere.

16. The method of claim 1, wherein the one or more carboxylic acids are present in the acidic aqueous solution or dispersion in an amount of about 5% w/v to about 20% w/v.

17. The method of claim 1, wherein a pH of the acidic aqueous solution or dispersion is from about 3.0 to about 3.5.

18. The method of claim 1, wherein the bare catalyst support material is in the form of a structured shape.

19. The method of claim 1, wherein the bare catalyst support material is in the form of pellets.

20. The method of claim 1, wherein the bare catalyst support material is in the form of a powder.

* * * * *